(12) United States Patent
Zeng et al.

(10) Patent No.: US 12,510,975 B2
(45) Date of Patent: Dec. 30, 2025

(54) NON-TOUCH GESTURE CONTROL METHOD AND ELECTRONIC DEVICE

(71) Applicant: Huawei Technologies Co., Ltd., Shenzhen (CN)

(72) Inventors: Zhanxiu Zeng, Shenzhen (CN); Yexing Shen, Shenzhen (CN); Minjun Yu, Shanghai (CN); Yunfan Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/700,046

(22) PCT Filed: Aug. 23, 2022

(86) PCT No.: PCT/CN2022/114295
§ 371 (c)(1),
(2) Date: Apr. 10, 2024

(87) PCT Pub. No.: WO2023/061054
PCT Pub. Date: Apr. 20, 2023

(65) Prior Publication Data
US 2024/0338085 A1    Oct. 10, 2024

(30) Foreign Application Priority Data
Oct. 13, 2021   (CN) .......................... 202111194277.9

(51) Int. Cl.
*G06F 3/01* (2006.01)
*G01S 15/08* (2006.01)
(Continued)

(52) U.S. Cl.
CPC .............. *G06F 3/017* (2013.01); *G01S 15/88* (2013.01); *H04R 1/028* (2013.01); *G01S 15/08* (2013.01); *G01S 15/58* (2013.01); *H04R 2499/15* (2013.01)

(58) Field of Classification Search
CPC ...... G06F 3/017; G06F 3/043; G06F 3/04883; G06F 3/01; G01S 15/88; G01S 15/08;
(Continued)

(56) References Cited

U.S. PATENT DOCUMENTS 7,561,698 B1 *   7/2009  Pomerantz .............. H04R 5/02
                                                      381/56
8,270,634 B2 *   9/2012  Harney ................. H04R 3/005
                                                      381/113
(Continued)

FOREIGN PATENT DOCUMENTS

CN       104978022 A      10/2015
CN       105204650 A      12/2015
(Continued)

OTHER PUBLICATIONS

Emad A. Ibrahim et al:"Low Complexity Multi-directional In-Air Ultrasonic Gesture Recognition Using a TCN",Mar. 9, 2020 (Mar. 9, 2020), pp. 1259-1264, XP033781595.

*Primary Examiner* — Grant Sitta
(74) *Attorney, Agent, or Firm* — SLATER MATSIL, LLP

(57) ABSTRACT

An electronic device includes at least one speaker and at least one microphone. A method is applied to the device, where the method includes displaying a target application. The target application is an application that supports non-touch gesture recognition. The method further includes starting the at least one speaker to emit an autocorrelated ultrasonic signal. The method further includes starting the at least one microphone to collect a reflected signal reflected after the ultrasonic signal encounters a non-touch gesture.

(Continued)

The method further includes controlling, based on the target application and the reflected signal, the target application in response to the non-touch gesture.

18 Claims, 22 Drawing Sheets

(51) Int. Cl.
*G01S 15/58* (2006.01)
*G01S 15/88* (2006.01)
*H04R 1/02* (2006.01)

(58) Field of Classification Search
CPC ..... G01S 15/58; H04R 1/028; H04R 2499/15; G06V 40/25
See application file for complete search history.

(56) References Cited

U.S. PATENT DOCUMENTS

| | | | | |
|---|---|---|---|---|
| 8,887,129 | B1 * | 11/2014 | Annan | G06F 9/44505 |
| | | | | 717/174 |
| 8,907,929 | B2 * | 12/2014 | Li | G01S 15/876 |
| | | | | 345/177 |
| 2012/0206339 | A1 | 8/2012 | Dahl | |
| 2012/0243374 | A1 * | 9/2012 | Dahl | G06F 3/043 |
| | | | | 367/93 |
| 2020/0192497 | A1 * | 6/2020 | Knoppert | G06F 3/0412 |

FOREIGN PATENT DOCUMENTS

| | | | | | |
|---|---|---|---|---|---|
| CN | 105718064 | A | * | 6/2016 | |
| CN | 106446801 | A | | 2/2017 | |
| CN | 107943300 | A | | 4/2018 | |
| CN | 109857245 | A | | 6/2019 | |
| CN | 109857245 | B | * | 6/2021 | G06F 3/01 |

* cited by examiner

NON-TOUCH GESTURE CONTROL METHOD AND ELECTRONIC DEVICE

CROSS-REFERENCE TO RELATED APPLICATIONS

This application is a national stage of International Application No. PCT/CN2022/114295, filed on Aug. 23, 2022, which claims priority to Chinese Patent Application No. 202111194277.9, filed on Oct. 13, 2021. Both of the aforementioned applications are hereby incorporated by reference in their entireties.

TECHNICAL FIELD

This application relates to the field of electronic technologies, and in particular, to a non-touch gesture control method and an electronic device.

BACKGROUND

A non-touch gesture may be applied to human-machine interaction in an electronic device, so that it is convenient for a user to use the non-touch gesture (namely, an air gesture) at a long-distance location from the electronic device, to implement operations such as answering a call, browsing a web page, turning off music, and taking a screenshot.

Currently, an electronic device usually recognizes a non-touch gesture based on a photographed image, so that a user controls an application based on the non-touch gesture. However, the photographed image needs a bright light source. Otherwise, the electronic device cannot accurately recognize the non-touch gesture under a dim light source. As a result, the user cannot control the application based on the non-touch gesture, and user experience is affected.

Therefore, how an electronic device accurately recognizes a non-touch gesture to implement a corresponding operation is an urgent problem to be resolved.

SUMMARY

This application provides a non-touch gesture control method and an electronic device, so that the electronic device can accurately implement human-machine interaction of a non-touch gesture in a target application, to improve user experience in using the electronic device and the target application.

According to a first aspect, this application provides a non-touch gesture control method. The method is applied to an electronic device. The electronic device includes at least one speaker and at least one microphone.

The method includes the following steps:
displaying a target application, where the target application is an application that supports non-touch gesture recognition;
starting the at least one speaker to emit an autocorrelated ultrasonic signal;
starting the at least one microphone to collect a reflected signal reflected after the ultrasonic signal encounters a non-touch gesture; and
controlling, based on the target application and the reflected signal, the target application to respond to the non-touch gesture.

Autocorrelation refers to a dependency between an instantaneous value of a signal at one moment and an instantaneous value of the signal at another moment, and is a time domain description of the signal. In some embodiments, when an autocorrelation coefficient of a signal is greater than or equal to a preset value, the signal may be referred to as an autocorrelated signal, that is, the signal has a good autocorrelation characteristic. A size of the preset value is not limited in this application.

According to the non-touch gesture control method according to the first aspect, the electronic device can accurately implement human-machine interaction of the non-touch gesture in the target application by using the autocorrelated ultrasonic signal, hardware designs such as an existing speaker and a microphone in the electronic device, and software designs such as a gesture recognition algorithm. In this way, the electronic device can accurately control, in an environment with insufficient light or even a dark environment, the target application to respond to the non-touch gesture. This helps improve user experience in using the electronic device and the target application, does not need to add an additional component or use an expensive component in the electronic device, and reduces costs of controlling, by the electronic device, the target application to respond to the non-touch gesture.

In a possible design, when the ultrasonic signal includes one type of signal, the one type of signal is an autocorrelated signal, and a frequency range of the one type of signal falls within a first range.

Alternatively, when the ultrasonic signal includes two types of signals, both the two types of signals are autocorrelated signals, frequency ranges of the two types of signals fall within a first range, the two types of signals are emitted in a time division manner, the frequency ranges of the two types of signals are the same, and frequency change rates of the two types of signals are opposite.

The first range is related to a sampling rate of the microphone and an ultrasonic frequency range.

Therefore, the speaker can emit the ultrasonic signal to wide coverage, to increase a gesture recognition range of the electronic device, and further improve effect of recognizing a non-touch gesture by the electronic device, so that the electronic device can accurately recognize the non-touch gesture. This helps accurately implement human-machine interaction of the non-touch gesture.

In a possible design, the starting the at least one speaker to emit an ultrasonic signal includes:
when the electronic device includes one speaker, starting two channels of the speaker to emit the two types of signals in a time division manner; or
when the electronic device includes two speakers, starting the two speakers to emit the two types of signals in a time division manner.

Therefore, the electronic device is designed with different quantities of speakers, so that the different quantities of speakers can emit ultrasonic signals including two types of signals, to improve universality and practicability of the electronic device for recognizing the non-touch gesture.

In a possible design, a minimum value of a frequency response of the microphone falls within a second range, and the second range is used to ensure that the microphone is capable of receiving the reflected signal.

Therefore, the microphone can collect as many reflected signals as possible. This improves accuracy of recognizing the non-touch gesture by the electronic device, does not need to add an additional component or use an expensive component, and reduces costs of recognizing the non-touch gesture by the electronic device.

In a possible design, the controlling, based on the target application and the reflected signal, the target application to respond to the non-touch gesture includes:

extracting a distance feature and a speed feature of the reflected signal, where the distance feature indicates a change in a distance between a swing location of the non-touch gesture and the microphone, and the speed feature indicates a speed change of the non-touch gesture;

determining a gesture class of the non-touch gesture based on the distance feature and the speed feature; and controlling, based on the target application and the gesture class of the non-touch gesture, the target application to respond to the non-touch gesture.

Therefore, the electronic device can reflect the non-touch gesture by using the feature of the reflected signal, and can accurately recognize the non-touch gesture. This helps reduce an accidental trigger of a response in the target application, and reduces costs of recognizing the non-touch gesture by the electronic device.

In a possible design, when the electronic device includes one microphone, the electronic device further includes a shielding member of the microphone, where the shielding member is configured to adjust a propagation direction and/or a propagation amount of the ultrasonic signal, so that the electronic device is capable of distinguishing non-touch gestures in different directions.

When the electronic device includes at least two microphones, a maximum distance between the microphones is greater than a first threshold, where the first threshold is used to ensure that there is a location difference between the at least two microphones and a same speaker.

Therefore, the electronic device is designed with different quantities of microphones, so that the different quantities of microphones can receive reflected signals reflected when the ultrasonic signal encounters the non-touch gesture, to improve universality and practicability of the electronic device for recognizing the non-touch gesture.

In a possible design, before the starting the at least one speaker to emit an autocorrelated ultrasonic signal, the method further includes:

determining that a first switch of the electronic device is in a first state, where the first state of the first switch indicates that the electronic device enables a non-touch gesture recognition function.

Therefore, the electronic device may be further designed in a manner of using whether the target application supports non-touch gesture recognition as a trigger condition for adaptively enabling or disabling the electronic device to implement the non-touch gesture control method, so that the electronic device flexibly implements human-machine interaction of the non-touch gesture in the target application. This helps improve adaptability and flexibility of the electronic device, and further reduces overall power consumption of the electronic device.

In a possible design, before the starting the at least one speaker to emit an autocorrelated ultrasonic signal, the method further includes:

determining that the target application supports non-touch gesture recognition.

In a possible design, the determining that the target application supports non-touch gesture recognition includes:

when a storage module of the electronic device stores an identifier of the target application, determining that the target application supports non-touch gesture recognition, where the storage module is configured to store identifiers of all applications that support non-touch gesture recognition.

Therefore, a possible implementation is provided for determining the target application.

Alternatively, when a second switch of the target application is in a second state, determining that the target application supports non-touch gesture recognition, where a status of the second switch indicates whether the target application supports non-touch gesture recognition.

Therefore, another possible implementation is provided for determining the target application, and manners of determining the target application are enriched.

In a possible design, the method further includes:

stopping starting the at least one speaker and the at least one microphone when the electronic device is not plugged in or remaining power of the electronic device is less than a second threshold.

Therefore, the electronic device may adaptively stop a function of supporting non-touch gesture recognition of the electronic device/the target application, to ensure availability of a gesture recognition algorithm in the electronic device, and reduce overall power consumption of the electronic device.

According to a second aspect, this application provides an electronic device, including a memory and a processor. The memory is configured to store program instructions. The processor is configured to invoke the program instructions in the memory, so that the electronic device performs the non-touch gesture control method according to any one of the first aspect and the possible designs of the first aspect.

According to a third aspect, this application provides a chip system. The chip system is applied to an electronic device including a memory, a display, and a sensor. The chip system includes a processor. When the processor executes computer instructions stored in the memory, the electronic device performs the non-touch gesture control method according to any one of the first aspect and the possible designs of the first aspect.

According to a fourth aspect, this application provides a computer-readable storage medium. The computer-readable storage medium stores a computer program. When the computer program is executed by a processor, an electronic device is enabled to implement the non-touch gesture control method according to any one of the first aspect and the possible designs of the first aspect.

According to a fifth aspect, this application provides a computer program product, including execution instructions. The execution instructions are stored in a readable storage medium, and at least one processor of an electronic device may read the execution instructions from the readable storage medium. The at least one processor executes the execution instructions, so that the electronic device implements the non-touch gesture control method according to any one of the first aspect and the possible designs of the first aspect.

DETAILED DESCRIPTION OF ILLUSTRATIVE EMBODIMENTS

Figure 1:
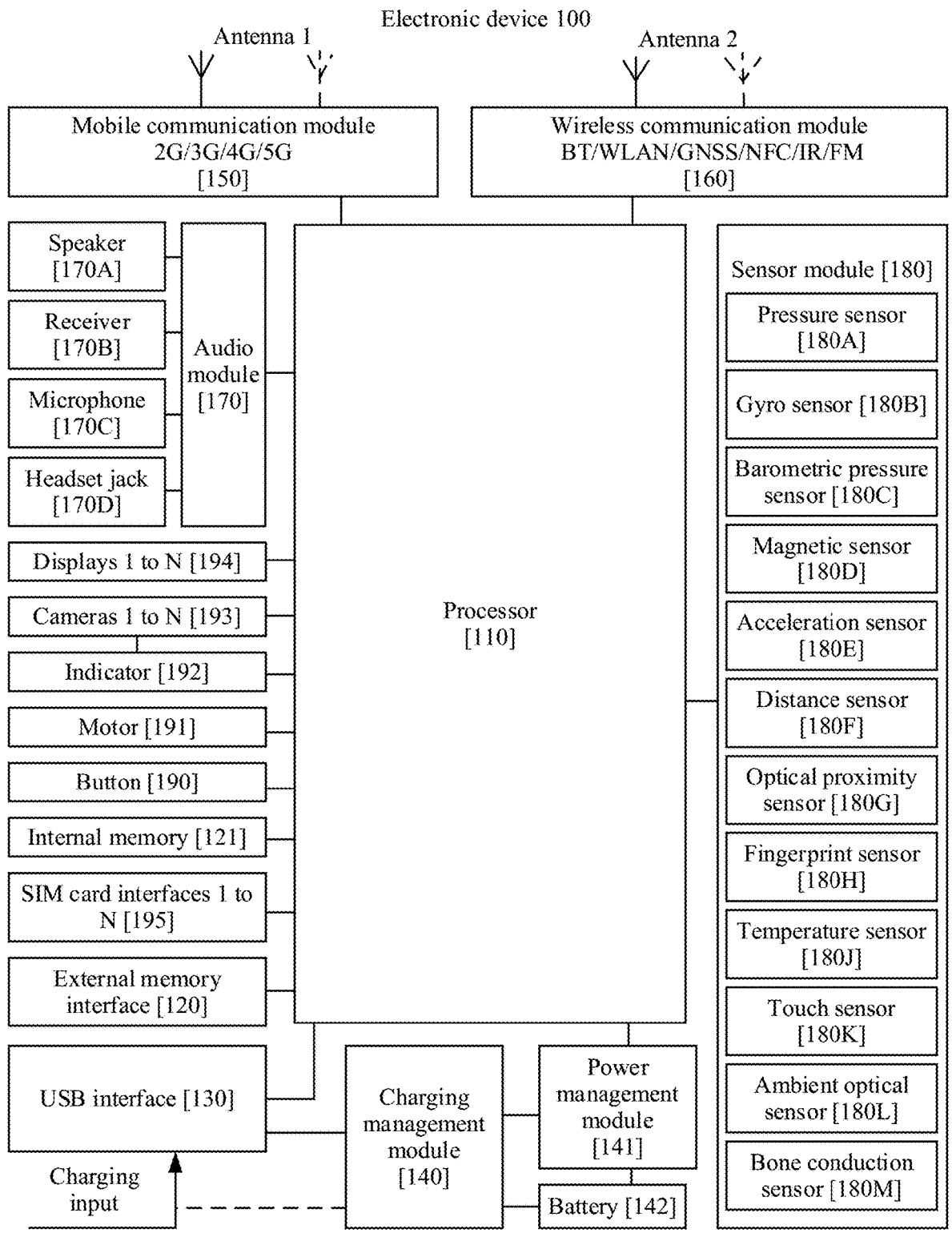
FIG. 1 is a schematic diagram of a structure of an electronic device according to an embodiment of this application.

In this application, "at least one" means one or more, and "a plurality of" means two or more. "And/Or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof means any combination of these items, including any combination of singular items (pieces) or plural items (pieces). For example, at least one of a, b, or c may represent: a, b, c, a combination of a and b, a combination of a and c, a combination of b and c, or a combination of a, b and c, where each of a, b, and c may be in a singular form or a plural form. In addition, terms "first" and "second" are merely used for a purpose of description, and shall not be understood as an indication or implication of relative importance. Directions or location relationships indicated by terms "center", "longitudinal", "transverse", "upper", "lower", "left", "right", "front", "rear" and the like are directions or location relationships based on the drawings, are merely intended to facilitate description and simplify description of this application, but not to indicate or imply that a specified apparatus or element needs to have a specific direction, be constructed in a specific orientation, be operated in a specific orientation. Therefore, it cannot be construed as a limitation on this application.

This application provides a non-touch gesture control method, an electronic device, a computer-readable storage medium, and a computer program product. Human-machine interaction of a non-touch gesture in a target application can be accurately implemented based on an ultrasonic signal with a good autocorrelation characteristic, hardware designs such as an existing speaker and a microphone in the electronic device, and software designs such as a gesture recognition algorithm. In this way, the electronic device can accurately control, in an environment with insufficient light or even a dark environment, the target application to respond to the non-touch gesture. This helps improve user experience in using the electronic device and the target application, does not need to add an additional component or use an expensive component in the electronic device, and reduces costs of controlling, by the electronic device, the target application to respond to the non-touch gesture.

Application scenario of the foregoing method may include but are not limited to an office scenario, an entertainment scenario, and a function scenario.

In the office scenario, a user can use non-touch gestures of classes such as swinging upward or downward or swinging leftward or rightward to read documents in formats such as PDF, word, and WPS, to implement quick interactive responses such as paging up or down. The user can also use the non-touch gestures of classes such as swinging upward or downward or swinging leftward or rightward to demonstrate documents in formats such as PPT, to implement the quick interactive responses such as paging up or down.

In the entertainment scenario, a user can use non-touch gestures of classes such as swinging upward or downward to play audio and a video, to implement quick interactive responses such as increasing or decreasing volume. The user can also use non-touch gestures of classes such as swinging leftward or rightward to browse photos in a gallery, to implement quick interactive responses such as paging up or down. The user can also use the non-touch gestures of the classes such as swinging upward or downward to make a video call, to implement quick interactive responses such as increasing or decreasing the volume.

In the function scenario, a user can use non-touch gestures of classes such as swinging upward or downward, opening a palm, holding a palm, or swinging leftward or rightward to quickly take a screenshot or select a plurality of processes, to implement quick interactive responses.

The electronic device may be a device, for example, a mobile phone (for example, a foldable mobile phone or a big-screen mobile phone), a tablet computer, a notebook computer, a wearable device, a vehicle-mounted device, an augmented reality (augmented reality, AR)/virtual reality (virtual reality, VR) device, a personal computer (personal computer, PC), an ultra-mobile personal computer (ultra-mobile personal computer, UMPC), a netbook, a personal digital assistant (personal digital assistant, PDA), a smart TV, a smart screen, a high-definition television, a 4K TV, a smart speaker, or a smart projector. A specific type of the electronic device is not limited in this application.

The following describes the electronic device in this application with reference to FIG. 1 by using an example in which the electronic device is a mobile phone.

FIG. 1 is a schematic diagram of a structure of an electronic device according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be configured to perform audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor no to the wireless communication module 160. For example, the processor no communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI may be configured to connect the processor 110 to a peripheral component such as the display 194 or the camera 193. The MIPI includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, a MIPI, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, may be configured to transmit data between the electronic device 100 and a peripheral device, or may be configured to connect to a headset for playing audio through the headset. The interface may be further configured to connect to another electronic device such as an AR device.

It may be understood that an interface connection relationship between modules illustrated in this application is merely an example for description, and does not constitute a limitation on the structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to perform mathematical and geometrical calculation, and is configured to render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

An internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, audio data or a phone book) created during use of the electronic device 100, and the like. In addition, the internal memory 121 may include a high-speed random access memory, or may include a non-volatile memory such as at least one magnetic disk storage device, a flash storage device, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When the electronic device 100 is configured to answer a call or receive voice information, the receiver 170B may be placed close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and recognize a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, x, y, and z axes) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover or a smart cover through the magnetic sensor 180D. In some embodiments, when the electronic device 100 is a clamshell phone, the electronic device 100 may detect opening and closing of a flip cover through the magnetic sensor 180D. Further, a feature, for example, automatic unlocking upon opening of the flip cover is set based on a detected opening or closing state of the smart cover or a detected opening or closing state of the flip cover.

The acceleration sensor 180E may detect accelerations in various directions (usually on three axes) of the electronic device 100, and may detect a magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F, to implement quick focusing.

The optical proximity sensor 180G may include, for example, a light-emitting diode (LED), and an optical detector, for example, a photodiode. The light-emitting diode may be an infrared light-emitting diode. The electronic device 100 emits infrared light through the light-emitting diode. The electronic device 100 uses the photodiode to detect infrared reflected light from an object nearby. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 18J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen that is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195. The plurality of cards may be of a same type or of different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this application, an example of a software structure of the electronic device 100 is described by using an example of an Android system with a layered architecture. A type of an operating system of the electronic device is not limited in this application, for example, an Android system, a Linux system, a Windows system, an iOS system, or a Harmony operating system (Harmony operating system, HarmonyOS).

Figure 2:
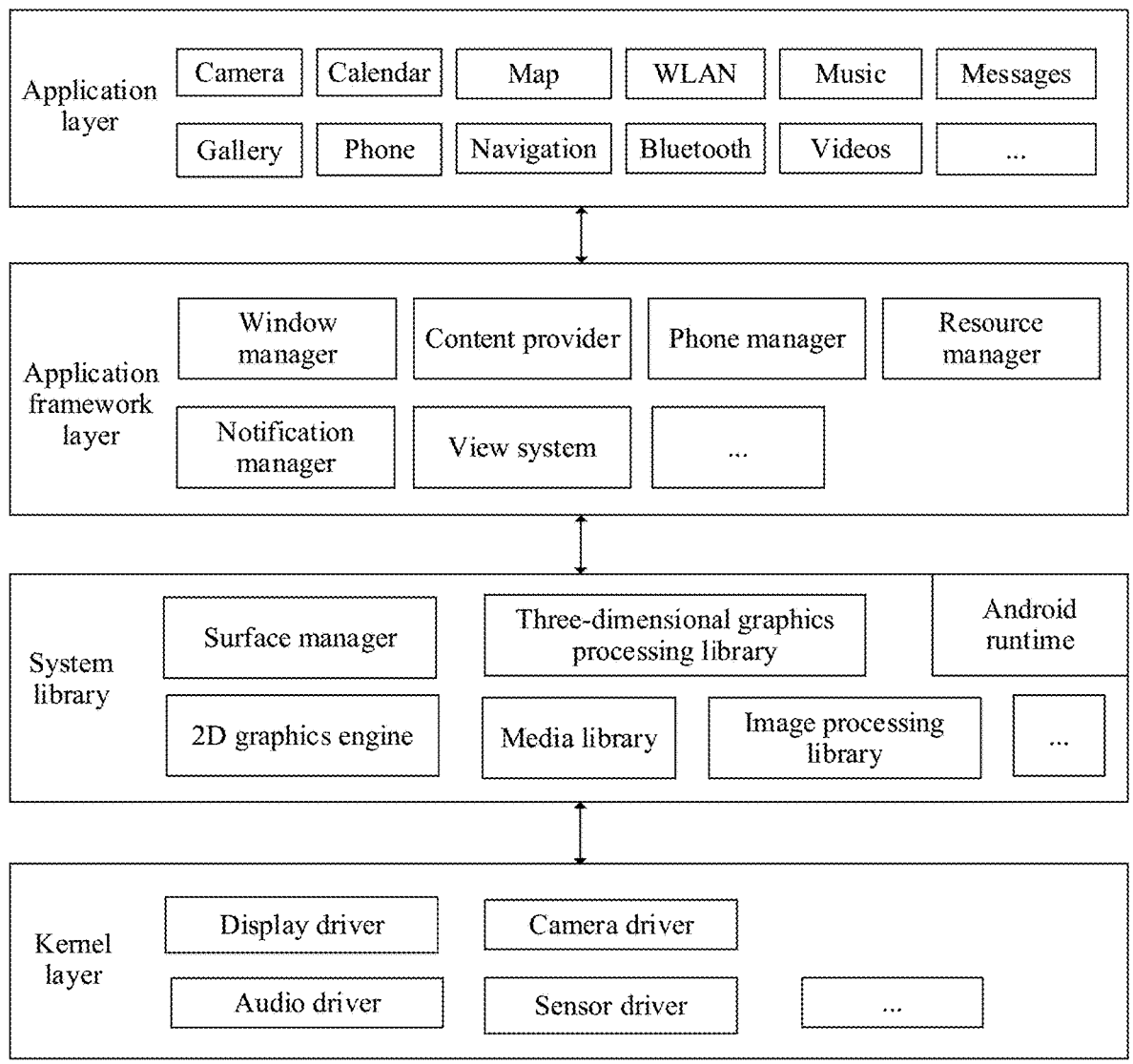
FIG. 2 is a block diagram of a software structure of an electronic device according to an embodiment of this application.

FIG. 2 is a block diagram of a software structure of an electronic device according to an embodiment of this application. As shown in FIG. 2, in a layered architecture, software is divided into several layers, and each layer has a clear role and task. The layers communicate with each other through a software interface. In some embodiments, the Android system is divided into four layers from top to bottom: an application layer (APP), an application framework layer (APP framework), an Android runtime (Android runtime) and system library (library), and a kernel layer (kernel).

The application layer may include a series of application packages.

As shown in FIG. 2, the application package may include applications (applications, APPs) such as Camera, Gallery, Calendar, Phone, Map, Navigation, WLAN, Bluetooth, Music, Videos, Game, Chat, Shopping, Traveling, Instant Messaging (Messages), Smart Home, and Device Control.

The smart home application may be used to control or manage a home device having a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set-top box, a door, and a window.

In addition, the application package may further include applications such as a home screen (namely, a desktop), a leftmost screen, a control center, and a notification center. The leftmost screen may also be referred to as a "−1 screen", and refers to a user interface (user interface, UI) obtained by sliding a screen rightward on a home screen of an electronic device until sliding to the leftmost split screen. For example, the leftmost screen may be used to place some quick service functions and notification messages, such as global search, a quick entry (such as payment code, and WeChat) of a page of an application, an instant message and a reminder (such as express delivery information, expenditure information, commuting road conditions, taxi hailing information, and schedule information), and followed dynamic information (such as a football platform, a basketball platform, and stock information). The control center is a pull-up message notification bar of the electronic device, namely, a user interface displayed by the electronic device when a user starts to pull up at the bottom of the electronic device. The notification center is a drop-down message notification bar of the electronic device, namely, a user interface displayed by the electronic device when a user starts to perform a downward operation on the top of the electronic device.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager (window manager) is used to manage window programs, for example, manage window status, attributes, view (view) addition, deletion, update, window sequence, and message collection and processing. The window manager may obtain a size of a display, determine whether there is a status bar, perform screen locking, take a screenshot, and the like. In addition, the window manager is an entry for external access to the window.

The content provider is used to store and obtain data, and enable the data to be accessed by an application. The data may include a video, an image, audio, calls that are made and answered, browsing history and bookmarks, a phone book, and the like.

The view system includes visual controls such as a control for displaying a text and a control for displaying an image. The view system may be used to construct an application. A display interface may include one or more views. For example, a display interface including an SMS message notification icon may include a text display view and an image display view.

The phone manager is used to provide a communication function for the electronic device 100, for example, management of a call status (including answering, declining, or the like).

The resource manager (resource manager) provides, for an application, various resources such as a localized character string, an icon, an image, a layout file (layout xml) of a user interface, a video file, a font, a color, and an identity document (identity document, ID) of a user interface module (user interface module, UI component). In addition, the resource manager is used to manage the foregoing resources together.

The notification manager enables an application to display notification information in a status bar, and may be used to convey a notification-type message. The message may automatically disappear after a short pause without user interaction. For example, the notification manager is used to notify download completion, give a message notification, and the like. The notification manager may alternatively be a notification that appears in a top status bar of the system in a form of a graph or a scroll bar text, for example, a notification of an application that is run in a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is used to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGLES), a 2D graphics engine (for example, SGL), and an image processing library.

The surface manager is used to manage a display subsystem and provide fusion of 2D and 3D layers for a plurality of applications.

The media library supports playback and recording in a plurality of frequently used audio and video formats, a static image file, and the like. The media library may support a plurality of audio and video coding formats such as MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of working procedures of software and hardware of the electronic device 100 with reference to a scenario in which a sound is played through a smart speaker.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a smart speaker icon. The smart speaker application invokes an interface of the application framework layer to start a smart speaker application, and then starts the audio driver by invoking the kernel layer. An audio electrical signal is converted into an audio signal by the speaker 170A.

It may be understood that the structure illustrated in this application does not constitute a specific limitation on the electronic device 100. In some other embodiments, the electronic device 100 may include more or fewer components than those shown in the figure, some components may be combined, some components may be split, or different component arrangements may be used. The components shown in the figure may be implemented by hardware, software, or a combination of software and hardware.

Based on the foregoing description, in the following embodiments of this application, an electronic device having the structures shown in FIG. 1 and FIG. 2 are used as an example, and the electronic device and the non-touch gesture control method provided in this application are described in detail with reference to the accompanying drawings and application scenarios.

Figure 3A:
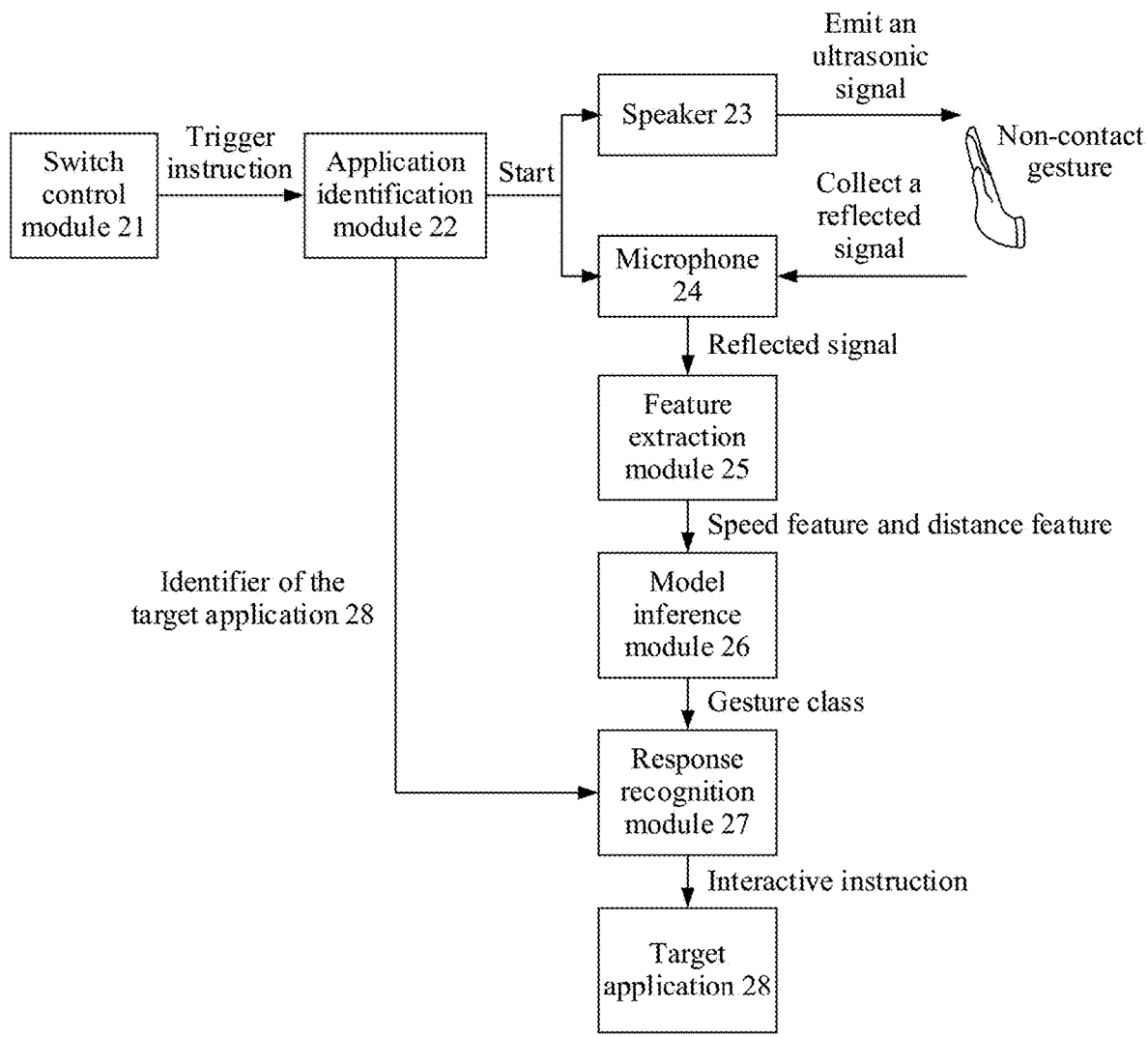
FIG. 3A is a block diagram of a software and hardware structure for implementing a non-touch gesture control method of an electronic device according to an embodiment of this application.
Figure 3B:
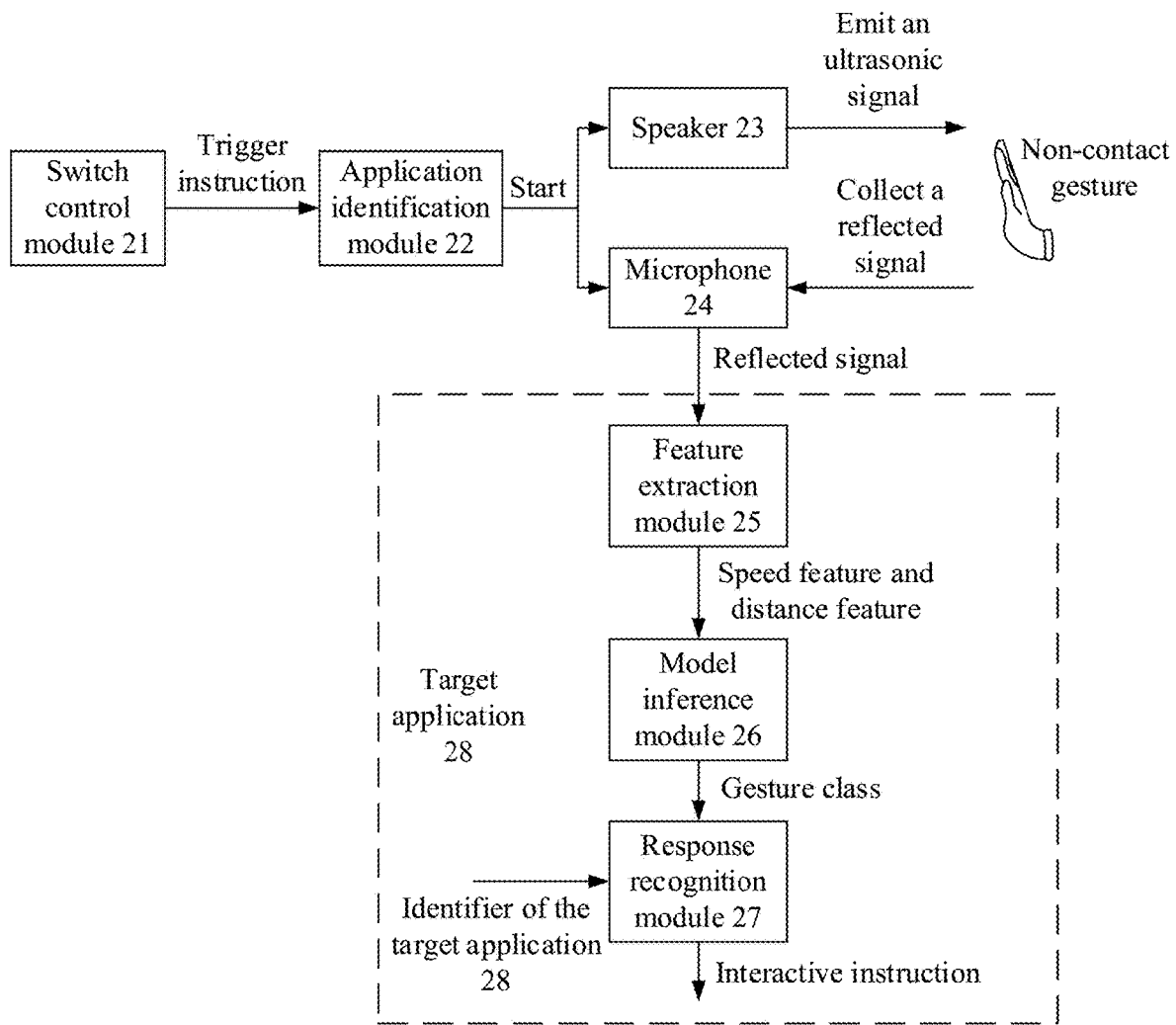
FIG. 3B is a block diagram of a software and hardware structure for implementing a non-touch gesture control method of an electronic device according to an embodiment of this application.
Figure 4:
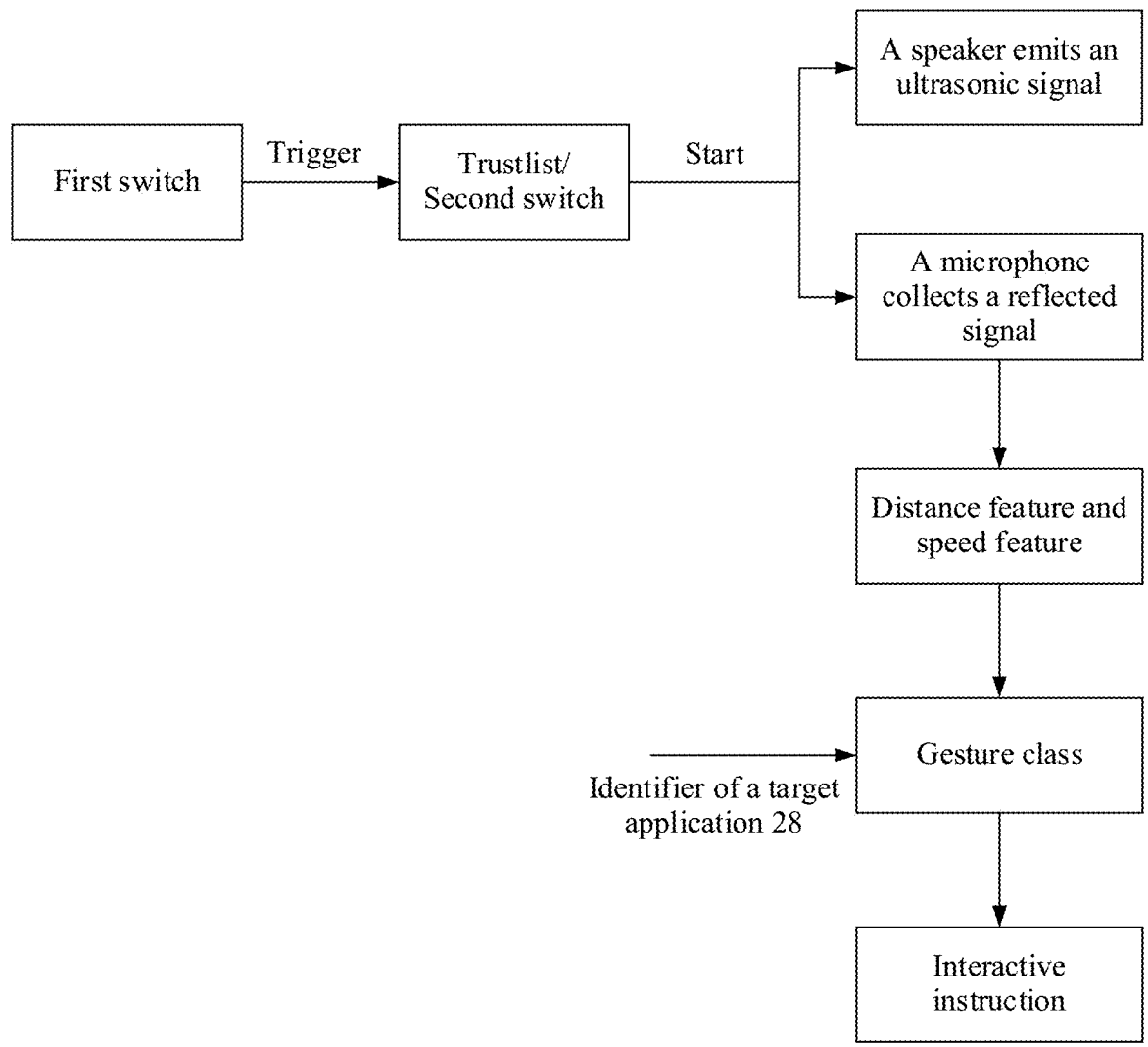
FIG. 4 is a software block diagram for implementing a non-touch gesture control method of an electronic device according to an embodiment of this application.

Refer to FIG. 3A, FIG. 3B, and FIG. 4. FIG. 3A and FIG. 3B are two block diagrams of software and hardware structures for implementing a non-touch gesture control method of an electronic device according to an embodiment of this application. FIG. 4 is a software block diagram for implementing a non-touch gesture control method of an electronic device according to an embodiment of this application.

As shown in FIG. 3A and FIG. 3B, the block diagram of the software and hardware structure for implementing the non-touch gesture control method of the electronic device may include a switch control module 21, an application identification module 22, a speaker 23, a microphone 24, a feature extraction module 25, a model inference module 26, a response recognition module 27, and a target application 28.

A difference between FIG. 3A and FIG. 3B lies in that, in FIG. 3A, a software system of the electronic device recognizes a non-touch gesture, and the software system of the electronic device includes the feature extraction module 25, the model inference module 26, and the response recognition module 27. In FIG. 3B, the target application 28 recognizes a non-touch gesture, and the target application 28 includes the feature extraction module 25, the model inference module 26, and the response recognition module 27.

With reference to FIG. 4, the following describes in detail possible implementations of the modules in FIG. 3A and FIG. 3B in the non-touch gesture control method implemented by the electronic device.

The switch control module 21 may be software code set in the electronic device.

The switch control module 21 is configured to: detect a status of a first switch, and determine, based on the status of the first switch, whether to send a trigger instruction to the application identification module 22.

The first switch may be a software switch in the software system of the electronic device, and/or the first switch may be a hardware switch on a housing of the electronic device. Parameters such as a location, a shape, and a size of the first switch are not limited in this application.

The trigger instruction is used to trigger the application identification module 22. A specific implementation of the trigger instruction is not limited in this application. For example, the trigger instruction may be represented in a form, for example, a letter, binary, or a numeral.

A first state may be an enabled state or a disabled state. This is not limited in this application. In addition, the status of the first switch may further indicate whether the electronic device enables a non-touch gesture recognition function.

Therefore, when the first switch is in the first state, the switch control module 21 may determine that the electronic device enables the non-touch gesture recognition function, and send the trigger instruction to the application identification module 22. When the first switch is not in the first state, the switch control module 21 may determine that the electronic device does not enable the non-touch gesture recognition function, and do not send the trigger instruction to the application identification module 22.

In addition, after a user performs an operation, for example, enabling or disabling on the first switch, the electronic device may display prompt information corresponding to the foregoing operation, to help notify the user whether the electronic device currently supports non-touch gesture recognition. A specific implementation of the prompt information corresponding to the foregoing operation is not limited in this application.

It should be noted that, in addition to the foregoing manner, the switch control module 21 may alternatively consider by default that the first switch is in the first state. In addition, the switch control module 21 is an optional module. Correspondingly, the application identification module 22 does not need to start to identify the target application 28 after receiving the trigger instruction.

The application identification module 22 may be software code set in the electronic device.

The application identification module 22 is configured to: after receiving the trigger instruction, identify the target application 28, and determine whether the target application 28 supports non-touch gesture recognition.

The identified target application 28 is an application that has been started by the electronic device, and a user interface displayed in the electronic device of the target application 28 is a focus window of the electronic device. The focus window of the electronic device mentioned in this application may be understood as a current operation window of the electronic device, namely, a window that can be operated by the user. Related parameters such as a type, a user interface, and a display location of the target application 28 are not limited in this application. Content in the user interface may be represented in a form, for example, a text, an image, a video, or audio.

The application identification module 22 may determine, in a plurality of manners, whether the target application 28 supports non-touch gesture recognition.

In some embodiments, a trustlist may be set in the application identification module 22, and whether the trustlist stores related information of the target application 28 is determined to determine whether the target application 28 supports non-touch gesture recognition.

The trustlist stores related information of all applications that support the non-touch gesture. Related information of an application may include an identifier of the application, an identifier of the application and an identifier of a process of the application, or the like. The identifier of the application may be represented in a form, for example, an application name or an ID of the application. The process of the application may be understood as an execution process in which the application implements a user interface displayed in the electronic device. The identifier of the process may be represented in a form, for example, a process name or an ID of the process.

Therefore, when the trustlist stores the related information of the target application 28, the application identification module 22 may determine that the target application 28 supports non-touch gesture recognition. When the trustlist does not store the related information of the target application 28, the application identification module 22 may determine that the target application 28 does not support non-touch gesture recognition.

In some other embodiments, the application identification module 22 may detect a status of a second switch, and may determine, based on the status of the second switch, whether the target application 28 supports non-touch gesture recognition.

The second switch may be a software switch in the software system of the electronic device, and/or the second switch may be a software switch in the target application. Parameters such as a location, a shape, and a size of the second switch are not limited in this application.

A specific implementation of the trigger instruction is not limited in this application.

Therefore, when the second switch is in a second state, the application identification module 22 may determine that the target application 28 supports non-touch gesture recognition. When the second switch is not in a second state, the application identification module 22 may determine that the target application 28 does not support non-touch gesture recognition.

The second state may be an enabled state or a disabled state. This is not limited in this application.

In addition, after a user performs an operation, for example, enabling or disabling on the second switch, the electronic device may display prompt information corresponding to the foregoing operation, to help notify the user whether the target application 28 currently supports non-touch gesture recognition. A specific implementation of the prompt information corresponding to the foregoing operation is not limited in this application.

In addition, after determining, in the foregoing manner, that the target application 28 supports non-touch gesture recognition, the application identification module 22 is further configured to determine, based on a scenario type of a user interface of the target application 28, whether the target application 28 supports non-touch gesture recognition.

The scenario type corresponding to the user interface of the target application 28 may include a text browsing scenario, an image browsing scenario, a voice playing scenario, a video playing scenario, and the like.

Therefore, when the scenario type corresponding to the user interface of the target application 28 supports a non-touch gesture, the application identification module 22 may determine that the target application 28 supports non-touch gesture recognition. When the scenario type corresponding to the user interface of the target application 28 does not support a non-touch gesture, the application identification module 22 may determine that the target application 28 does not support non-touch gesture recognition.

In addition, in addition to determining whether the scenario type of the user interface of the target application 28 supports the non-touch gesture, the application identification module 22 is further configured to determine a gesture class of the non-touch gesture supported by the scenario type of the user interface of the target application 28, to facilitate notifying the gesture class to the user in a timely manner.

The gesture class of the non-touch gesture supported by the scenario type corresponding to the user interface of the target application 28 may be understood as one or more gesture classes of non-touch gestures that can be used by the user in the user interface of the target application 28.

In conclusion, after determining that the target application 28 supports non-touch gesture recognition, the application identification module 22 can start the speaker 23 to emit an ultrasonic signal and start the microphone 24 to collect a reflected signal.

In addition, at the same time, the application identification module 22 may start the feature extraction module 25, the model inference module 26, and the response recognition module 27 to perform corresponding functions (the foregoing process is not shown in FIG. 3A, FIG. 3B, and FIG. 4).

In addition, in FIG. 3A, after determining whether the target application 28 supports non-touch gesture recognition, the application identification module 22 is further configured to send an identifier of the target application 28 to the response recognition module 27. In FIG. 3B, after determining whether the target application 28 supports non-touch gesture recognition, the application identification module 22 does not need to send an identifier of the target application 28 to the response recognition module 27, and the response recognition module 27 may directly obtain the identifier of the target application 28. When it is determined that the target application 28 does not support non-touch gesture recognition, if the speaker 23 and the microphone 24 are not started, the application identification module 22 does not need to start the speaker 23 to emit an ultrasonic signal and start the microphone 24 to collect a reflected signal. If the speaker 23 and the microphone 24 have been started, the application identification module 22 controls the speaker 23 and the microphone 24 to stop being started.

The speaker 23 is disposed in the electronic device. The speaker 23 is configured to emit an ultrasonic signal, so that a non-touch gesture can reflect the ultrasonic signal emitted by the speaker 23. Parameters such as a quantity of the speakers 23 and a type of the speaker 23 are not limited in this application.

The microphone 24 is disposed in the electronic device. The microphone 24 is configured to: collect a reflected signal, and transmit the reflected signal to the feature extraction module 25. Parameters such as a quantity of the microphones 24 and a type of the microphone 24 are not limited in this application.

It should be noted that, a reflected signal reflected after the ultrasonic signal encounters the non-touch gesture is inevitably mixed with an ultrasonic signal reflected after the ultrasonic signal encounters an ambient environment of the electronic device. Therefore, the reflected signal collected by the microphone 24 includes a reflected signal reflected after the ultrasonic signal encounters the ambient environment of the electronic device, and an ultrasonic signal reflected after the ultrasonic signal encounters the non-touch gesture.

The feature extraction module 25 is software code, and the feature extraction module 25 may be disposed in the software system of the electronic device.

The feature extraction module 25 is configured to filter out, from the reflected signals, the ultrasonic signal reflected when the ultrasonic signal encounters the ambient environment of the electronic device, to obtain the reflected signal reflected when the ultrasonic signal encounters the non-touch gesture, extracts features such as a distance feature and a speed feature represented by the reflected signal reflected when the ultrasonic signal encounters the non-touch gesture, and transmits the distance feature and the speed feature to the model inference module 26.

The speed feature indicates a speed change of the non-touch gesture. The distance feature indicates a change of a distance between a swing location of the non-touch gesture and the microphone.

The model inference module 26 is software code, and the model inference module 26 may be disposed in the software system of the electronic device. This is not limited in this application.

The model inference module 26 is configured to recognize a gesture class of the non-touch gesture based on the distance feature and the speed feature, and transmit the gesture class of the non-touch gesture to the response recognition module 27.

A gesture class of a non-touch gesture mentioned in this application may include but is not limited to a palm action (such as swinging, opening, holding, hovering, and moving), a finger action (such as swinging, hovering, and changing in quantity of fingers), and a hand action (such as swinging, opening, holding, hovering, and moving). A specific implementation of the non-touch gesture is not limited in this application.

In addition, a gesture location of the non-touch gesture needs to be within a gesture recognition range of the electronic device, to ensure that the ultrasonic signal can reflect a reflected signal when encountering the non-touch gesture.

A specific value of the gesture recognition range of the electronic device is not limited in this application. In some embodiments, the electronic device may display the gesture recognition range of the electronic device, so that the user can make an effective non-touch gesture within the gesture recognition range of the electronic device, and the electronic device can recognize the non-touch gesture.

The response recognition module 27 is software code, and the response recognition module 27 may be disposed in the software system of the electronic device.

The response recognition module 27 is configured to transmit an interactive instruction to the target application 28 based on the identifier of the target application 28 and the gesture class of the non-touch gesture.

The interactive instruction is used to control the target application 28 to respond to the non-touch gesture, so that the target application 28 implements human-machine interaction of the non-touch gesture. A specific implementation of the interactive instruction is not limited in this application. For example, the interactive instruction may be represented in a form, for example, a letter, binary, or a numeral.

The target application 28 is used to respond to the interactive instruction, to control the target application 28 to respond to the non-touch gesture.

In conclusion, the electronic device needs hardware design on the speaker 23 and the microphone 24, and further needs software design on the switch control module 21, the application identification module 22, the feature extraction module 25, the model inference module 26, the response recognition module 27, and the target application 28, so that based on the hardware design and the software design, the electronic device can start the speaker 23 to emit the ultrasonic signal, and start the microphone 24 to collect the reflected signal reflected when the ultrasonic signal encounters the non-touch gesture, and collects the non-touch gesture based on a feature change of the reflected signal, to implement human-machine interaction of the non-touch gesture in the target application 28.

It should be noted that, in addition to the foregoing implementation, the feature extraction module 25, the model inference module 26, and the response recognition module 27 may alternatively be disposed in a server of the target application 28. After the feature extraction module 25, the model inference module 26, and the response recognition module 27 respectively perform operations, the server of the target application 28 may return an execution result to the target application 28. Thus, the target application 28 can implement human-machine interaction of the non-touch gesture. The following separately describes in detail the hardware design and the software design related to the non-touch gesture control method implemented by the electronic device.

1. Hardware Design

In the hardware design, layout settings and parameter constraints of the speaker and the microphone are designed for the electronic device. This improves accuracy of recognizing a non-touch gesture by the electronic device, does not need to add an additional component or use an expensive component, and reduces costs of recognizing the non-touch gesture by the electronic device.

1. Layout Settings 1.1 Speaker

According to the electronic device, the speaker may be disposed on a non-touch surface of the electronic device (for example, a surface of the electronic device other than a surface in contact with a table when the electronic device is placed on the table), to ensure that an ultrasonic signal emitted by the speaker has wide coverage. This helps the electronic device have a better recognition effect on a non-touch gesture.

Parameters such as a quantity of speakers, and a type and a location of the speaker are not limited in this application.

In some embodiments, there may be one speaker. In some other embodiments, there may be at least two speakers. The at least two speakers are symmetrically disposed, that is, the at least two speakers have symmetrical locations, and may be of central symmetry or axial symmetry. The foregoing content is not limited in this application, provided that a propagation range of the ultrasonic signal emitted by the speaker is as wide as possible.

1.2 Microphone

According to the electronic device, the microphone may be disposed at a location close to a user side in the electronic device, so that the microphone can receive a reflected signal. This helps the electronic device have a better recognition effect on a non-touch gesture.

Parameters such as a quantity of microphones, and a type and a location of the microphone are not limited in this application.

In some embodiments, there may be one microphone, and the electronic device is further provided with a shielding member of the microphone. A propagation channel of the reflected signal may be adjusted by using the shielding member, so that the microphone collects reflected signals with different features.

For non-touch gestures with opposite gesture directions, in this application, the non-touch gestures with the opposite gesture directions are respectively referred to as a gesture 1 and a gesture 2, and reflected signals reflected when an ultrasonic signal separately encounters the gesture 1 and the gesture 2 are respectively referred to as a signal 1 and a signal 2. Specific implementations of the gesture 1 and the gesture 2 are not limited in this application. For example, the gesture 1 is a leftward swing, and the gesture 2 is a rightward swing. The gesture 1 is an upward swing, and the gesture 2 is a downward swing.

The electronic device may collect signals 1 and 2 with different features through a microphone and a shielding member. In this way, the electronic device may distinguish the gesture 1 from the gesture 2 based on the signal 1 and 2 with different features, so that the electronic device can recognize non-touch gestures in different directions.

The propagation channel may be represented by using a parameter, for example, a propagation amount or a propagation direction. In addition, the propagation channel mentioned in this application may also be referred to as an echo path/propagation path. In some embodiments, reflected signals with different features may be represented by different occurrence moments of peaks or troughs in feature heat maps of the reflected signals.

A specific implementation of the shielding member is not limited in this application. For example, the shielding member may be made of plastics, ceramics, or the like. In some embodiments, the shielding member is a conducting member with two openings, one opening of the shielding member is configured to cover/wrap a sound pickup hole that is in communication with the microphone and that is disposed on a housing of the electronic device, and the other opening of the shielding member is provided with a sound collection hole. Thus, parameters such as a quantity of sound collection holes, and a location and a diameter of the sound collection hole are adjusted to change the propagation channel of the reflected signal.

The following describes in detail a specific implementation of the shielding member, and an example in which the electronic device is a mobile phone is used for illustration.

In some embodiments, a sound pickup hole is disposed on a housing of the mobile phone, and the sound pickup hole communicates with a sound pickup surface of a microphone through a connector. The shielding member is a conducting member with two openings, one opening of the shielding member covers/wraps the sound pickup hole, a surface where one opening of the shielding member is located is adjacent to a surface where the other opening of the shielding member is located, the surface where the other opening of the shielding member is located is an oblique tangent surface, and the other opening of the shielding member is provided with a sound collection hole, so that a reflected signal can be propagated to the sound pickup surface of the microphone sequentially through the sound collection hole, the sound pickup hole, and the connector.

A specific implementation of the surface where the other opening of the shielding member is located is not limited in this application. In some embodiments, the surface where the other opening of the shielding member is located is not perpendicular to the surface where one opening of the shielding member is located. In addition, parameters such as a quantity of sound collection holes, and a location and a shape of the sound collection hole are not limited in this application.

Because the sound collection hole is disposed on the oblique tangent surface of the shielding member, reflected signals need to first pass through the sound collection hole. Therefore, the sound collection hole is disposed to change propagation directions and propagation amounts of a signal 1 and a signal 2, so that features of the signal 1 and the signal 2 are different. In this way, the electronic device can distinguish non-touch gestures in opposite gesture directions. In this way, the electronic device can recognize non-touch gestures in all swing directions.

In some other embodiments, a sound pickup hole is disposed on a housing of the mobile phone, and the sound pickup hole communicates with a sound pickup surface of a microphone through a connector. The shielding member is a conducting member with two openings, one opening of the shielding member covers/wraps the sound pickup hole, a surface where one opening of the shielding member is located is opposite or adjacent to a surface where the other opening of the shielding member is located, and the other opening of the shielding member is provided with a sound collection hole 1 and a sound collection hole 2 that have different signal throughputs, so that a reflected signal can pass through the sound collection hole 1 and the sound collection hole 2, and then is propagated to the sound pickup surface of the microphone through the sound pickup hole and the conducting member.

When the surface where one opening of the shielding member is located is opposite to the surface where the other opening of the shielding member is located, both the sound collection hole 1 and the sound collection hole 2 are disposed on a surface that is of the shielding member and that is away from the housing of the mobile phone. When the surface where one opening of the shielding member is located is adjacent to the surface where the other opening of the shielding member is located, the sound collection hole 1 and the sound collection hole 2 are respectively disposed on two opposite surfaces of the shielding member.

Different diameters and/or quantities may be used for the sound collection hole 1 and the sound collection hole 2, so that the sound collection hole 1 and the sound collection hole 2 have different signal throughputs. Parameters such as locations, quantities, and shapes of the sound collection holes 1 and 2 are not limited in this application. For example, there is one sound collection hole 1, there are two sound collection holes 2, and a diameter of the sound collection hole 1 is greater than a diameter of the sound collection hole 2.

Because the sound collection hole 1 and the sound collection hole 2 have different signal throughputs, all reflected signals need to first pass through the sound collection hole 1 and the sound collection hole 2. Therefore, the sound collection hole 1 and the sound collection hole 2 are disposed to change propagation directions and propagation amounts of a signal 1 and a signal 2, so that features of the signal 1 and the signal 2 are different, and the electronic device can distinguish non-touch gestures in opposite swing directions. In this way, the electronic device can recognize non-touch gestures in all swing directions.

It should be noted that the shielding member may be fixedly disposed on the housing of the electronic device, or may be inserted into the housing of the electronic device, to implement detachable connection of the shielding member. A connection manner of the shielding member is not limited in this application. In addition, parameters such as a quantity of sound pickup holes, and a location and a shape of the sound pickup hole are not limited in this application.

In addition, when there is one microphone, in addition to disposing the shielding member of the microphone, if the microphone is close to the sound pickup hole on the housing of the mobile phone, a shape of the microphone may also be changed to an irregular shape in this application. For example, a sound pickup surface or a solder surface of the microphone is set as an oblique tangent surface, to change a propagation channel of a reflected signal, so that the electronic device can distinguish non-touch gestures in opposite swing directions.

In some other embodiments, there may be at least two microphones. A maximum distance between the microphones is greater than a first preset threshold, and the first preset threshold is used to ensure that there is a location difference between different microphones relative to a same speaker, that is, there is a location difference between an emitting location of an ultrasonic signal and a collecting location of a reflected signal. This helps reflect a change of a non-touch gesture, and avoids a phenomenon that a non-touch gesture cannot be distinguished due to a close distance between the microphones. A specific value of the first preset threshold is not limited in this application.

In addition, in some embodiments, the microphone may be designed on a non-touch surface of a small electronic device such as a mobile phone. In some embodiments, the microphone may be designed at a front end location of a large electronic device such as a notebook computer or a PC, to easily collect a change of a reflected signal, and ensure that the change of the reflected signal can better reflect a non-touch gesture.

It should be noted that a distance between the speaker and the microphone is not limited in this application.

1.3 Example of Layout of Speaker and Microphone in Electronic Device

Figure 5A:
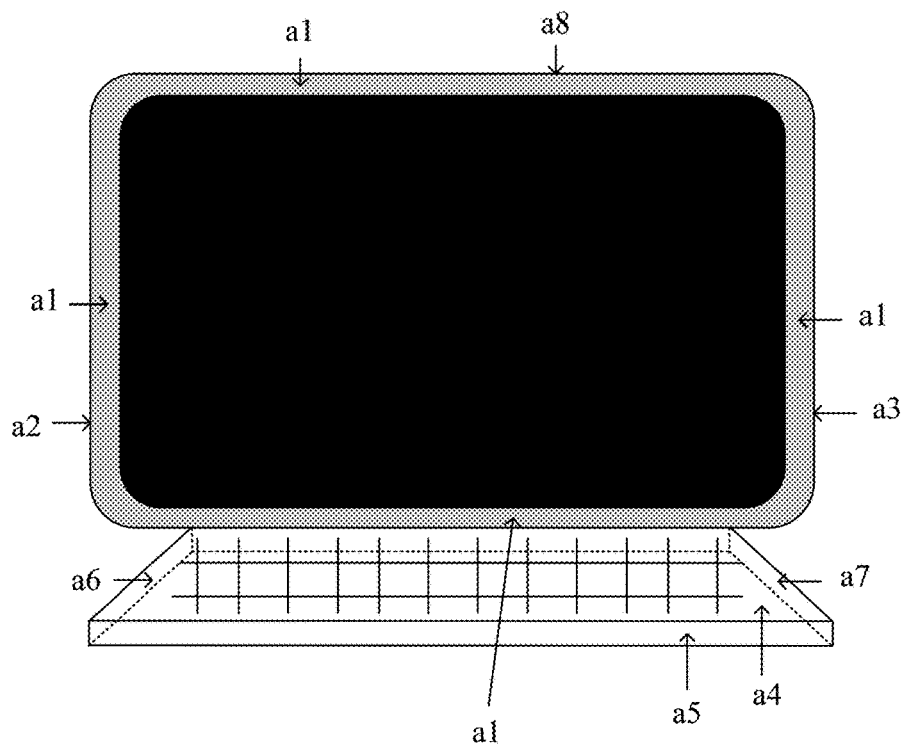
FIG. 5A is a schematic diagram of locations of a speaker and a microphone corresponding to a case in which an electronic device is a notebook computer according to an embodiment of this application.
Figure 5B:
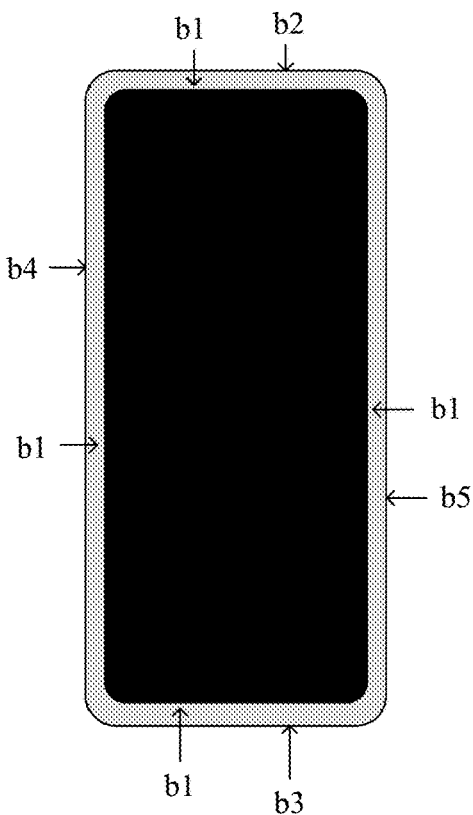
FIG. 5B is a schematic diagram of locations of a speaker and a microphone corresponding to a case in which an electronic device is a mobile phone according to an embodiment of this application.
Figure 5C:
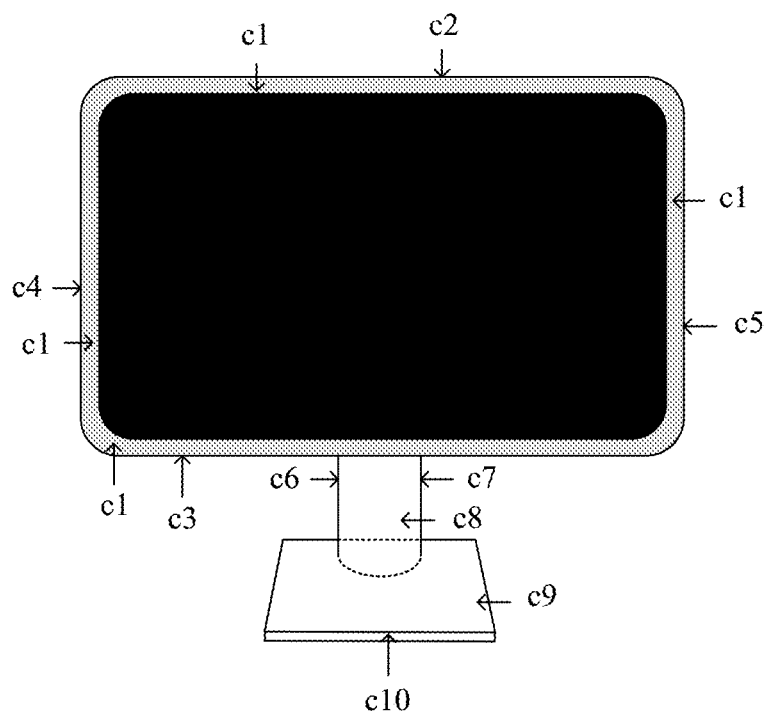
FIG. 5C is a schematic diagram of locations of a speaker and a microphone corresponding to a case in which an electronic device is a PC according to an embodiment of this application.

With reference to FIG. 5A to FIG. 5C, specific implementation locations of the speaker and the microphone in the electronic device are described in detail.

FIG. 5A is a schematic diagram of locations of a speaker and a microphone corresponding to a case in which the electronic device is a notebook computer according to an embodiment of this application.

As shown in FIG. 5A, the speaker may be disposed at a location in the notebook computer, for example, an edge location a1 that is of a screen and that faces a user side, a housing side a2 of the left side of the screen, a housing side a3 of the right side of the screen, a housing upper surface a4 that is of a keyboard and that faces the user side, a housing side a5 that surrounds the keyboard and that faces the user side, a housing side a6 surrounding the left side of the keyboard, or a housing side a7 surrounding the right side of the keyboard. Generally, there may be at least two speakers in the notebook computer, and the at least two speakers are symmetrical to left and right along the symmetry axis of the notebook computer, so that coverage of an ultrasonic signal is more uniform and wider.

With further reference to FIG. 5A, a location of the microphone in the notebook computer may be disposed close to the user side, for example, a grip location of the notebook computer. The microphone may be disposed at a location in the notebook computer, for example, the edge location a1 that is of the screen and that faces the user side, a housing side a8 of the upper side of the screen, the housing side a5 that surrounds the keyboard and that faces the user side, the housing side a6 surrounding the left side of the keyboard, or the housing side a7 surrounding the right side of the keyboard. Generally, there may be at least two microphones in the notebook computer, and the at least two microphones are symmetrical to left and right along the symmetry axis of the notebook computer, so that the microphones can receive as many reflected signals as possible.

For example, six speakers and three microphones may be disposed in the notebook computer. The six speakers are divided into three pairs, and each pair of speakers are symmetrically disposed. A first pair of speakers are respectively located at a left edge location and a right edge location in a1, a second pair of speakers are respectively located at a2 and a3, and a third pair of speakers both are located at a5. Two of the three microphones are symmetrically disposed, both the two microphones are located at a5, and the other microphone is located at a8.

FIG. 5B is a schematic diagram of locations of a speaker and a microphone corresponding to a case in which the electronic device is a mobile phone according to an embodiment of this application. As shown in FIG. 5B, the speaker may be disposed at a location in the mobile phone, for example, an edge location b1 that is of a screen and that faces a user side, a housing side b2 of the upper side of the screen, a housing side b3 of the lower side of the screen, a housing side b4 of the left side of the screen, or a housing side b5 of the right side of the screen. Generally, there may be at least two speakers in the mobile phone, and the at least two speakers are symmetrical to left and right along the symmetry axis of the mobile phone, so that coverage of an ultrasonic signal is more uniform and wider.

With further reference to FIG. 5B, the microphone may be disposed at a location in the mobile phone, for example, the edge location b1 that is of the screen and that faces the user side, the housing side b2 of the upper side of the screen, the housing side b3 of the lower side of the screen, the housing side b4 of the left side of the screen, or the housing side b5 of the right side of the screen. In some embodiments, when two or more microphones are disposed on one side edge of the screen of the mobile phone, at least one microphone is disposed on a side edge adjacent to the side edge. Generally, there may be at least two microphones in the mobile phone, and the at least two microphones are disposed in the mobile phone, so that the microphones can receive as many reflected signals as possible.

In addition, because the mobile phone is a handheld device, locations of the speaker and the microphone in the mobile phone need not be handheld.

For example, four speakers and four microphones may be disposed in the mobile phone. The four speakers are divided into two pairs, and each pair of speakers are symmetrically disposed. A first pair of speakers are respectively located at an upper edge location and a lower edge location in b1, and a second pair of speakers are respectively located at a left edge location and a right edge location in b1. The four microphones are divided into two pairs, and each pair of microphones are symmetrically disposed. A first pair of microphones are respectively located at b2 and b3, and a second pair of microphones are respectively located at b4 and b5.

FIG. 5C is a schematic diagram of locations of a speaker and a microphone corresponding to a case in which the electronic device is a PC according to an embodiment of this application. As shown in FIG. 5C, the speaker may be disposed at a location in the PC, for example, an edge location c1 that is of a screen and that faces a user side, a housing side c2 of an upper side of the screen, a housing side c3 of a lower side of the screen, a housing side c4 of a left side of the screen, a housing side c5 of a right side of the screen, a bracket side c6 of a left side of a bracket, a bracket side c7 of a right side of the bracket, c8 that is of the bracket and that faces the user side, or a base upper surface c9 that is of a base and that is close to the user side (namely, a contact surface between the base and the bracket). Generally, there may be at least two speakers in the PC, and the at least two speakers are symmetrical to left and right along the symmetry axis of the PC, so that coverage of an ultrasonic signal is more uniform and wider.

With further reference to FIG. 5C, a location of the microphone in the PC may be disposed closer to a user. The microphone may be disposed at a location in the PC, for example, the edge location c1 that is of the screen and that faces the user side, the housing side c2 of the upper side of the screen, the housing side c3 of the lower side of the screen, the housing side c4 of the left side of the screen, the housing side c5 of the right side of the screen, the base upper surface c9 that is of the base and that is close to the user side (namely, the contact surface between the base and the bracket), or a base side c10 that surrounds the base and that faces the user side. Generally, there may be at least two microphones in the PC, and the at least two microphones are symmetrical to left and right along the symmetry axis of the PC, so that the microphones can receive as many reflected signals as possible.

For example, four speakers and four microphones may be disposed in the PC. The four speakers are divided into two pairs, and each pair of speakers are symmetrically disposed. A first pair of speakers are symmetrically located at c6 and c7, and a second pair of speakers both are located at c9. The four microphones are divided into two pairs, and each pair of microphones are symmetrically disposed. A first pair of microphones both are located at c9, and a second pair of microphones both are located at c10. In conclusion, according to the electronic device, quantities and locations of speakers and microphones are arranged, so that the speakers can emit ultrasonic signals as widely as possible, and the microphones can collect as many reflected signals as possible. This improves an effect of recognizing a non-touch gesture by the electronic device, enables the electronic device to accurately recognize the non-touch gesture, and is beneficial to accurately implementing human-machine interaction of the non-touch gesture in a target application.

2. Hardware Parameter Constraints
2.1 Ultrasonic Signal Emitted by Speaker

In this application, the ultrasonic signal may include one type of signal, or may include a plurality of types of signals. This is not limited in this application. A condition that each type of signal in the ultrasonic signal needs to meet is that each type of signal is an autocorrelated signal, that is, the signal has a good autocorrelation characteristic.

Autocorrelation mentioned in this application refers to a dependency between an instantaneous value of a signal at one moment and an instantaneous value of the signal at another moment, and is a time domain description of the signal. In some embodiments, when an autocorrelation coefficient of a signal is greater than or equal to a preset value, the signal may be referred to as an autocorrelated signal, that is, the signal has a good autocorrelation characteristic. A size of the preset value is not limited in this application.

A specific type of the ultrasonic signal is not limited in this application. For example, the ultrasonic signal is a linear frequency modulation signal (Chirp signal for short), or a zero autocorrelation sequence (Zadoff-Chu Sequence, ZC series).

Therefore, the speaker can emit the ultrasonic signal with a good autocorrelation characteristic, so that the electronic device can extract, from reflected signals, a reflected signal reflected when the ultrasonic signal encounters a non-touch gesture, and filter out an ultrasonic signal reflected when the ultrasonic signal encounters an ambient environment of the electronic device, and the electronic device can accurately collect the non-touch gesture based on the reflected signal reflected when the ultrasonic signal encounters the non-touch gesture.

In addition, that a frequency range of each type of signal in the ultrasonic signal falls within a first range may be further designed for the electronic device. The frequency range (namely, a frequency band) of each type of signal is an actual frequency range of the signal. The first range is related to a sampling rate of the microphone and an ultrasonic frequency range.

Based on Shannon's sampling theorem, it can be learned that, in order to recover the ultrasonic signal without distortion, the sampling rate of the microphone needs to be greater than twice a maximum frequency of the ultrasonic signal. Therefore, a frequency of the ultrasonic signal needs to be less than half the sampling rate of the microphone.

Because an ultrasonic wave is a sound wave, the ultrasonic frequency range is greater than or equal to 20 kHz (hertz).

In conclusion, the first range is greater than or equal to 20 kHz and less than half the sampling rate of the microphone.

A size of the sampling rate of the microphone is not limited in this application. On the market, microphones in notebook computers and PCs have a sampling rate of 48 kHz. A microphone in a mobile phone has a sampling rate of 96 kHz or higher. For ease of description, an example in which the sampling rate of the microphone is 48 kHz is used for illustration in this application.

When the sampling rate of the microphone is 48 kHz, the first range is greater than or equal to 20 kHz and less than 24 kHz.

Therefore, the speaker can emit an ultrasonic signal whose frequency range falls within the first range, so that the microphone can collect a reflected signal within the first range.

When the speaker reflects a plurality of types of signals, in addition to that the foregoing condition is met, that a frequency band resource that corresponds to the first range and that allows propagation of an ultrasonic signal are limited is considered, so that the speaker can emit the plurality of types of signals in a multi-channel manner.

The frequency band resource that allows the propagation of the ultrasonic signal is related to the first range. For example, when the first range is greater than or equal to 20 kHz and less than 24 kHz, the frequency band resource corresponding to the first range is 4 kHz (namely, a difference between 24 kHz and 20 kHz).

The multi-channel manner means that the speaker needs to emit a plurality of types of signals in a time division manner (namely, in an alternate order/alternately). In addition, in some embodiments, frequency ranges of the plurality of types of signals are the same. In some other embodiments, frequency ranges of the plurality of types of signals are the same, and there are signals with opposite frequency change rates in the plurality of types of signals.

The frequency change rate refers to a frequency change trend, and may gradually increase or decrease. This is not limited in this application. In addition, a value of the frequency change rate is not limited in this application.

In addition, duration of an interval between two adjacent types of signals in the plurality of types of signals is not limited in this application.

Therefore, the speaker emits the ultrasonic signal in the multi-channel manner, so that a frequency range of the ultrasonic signal can occupy the first range as much as possible. This helps that the ultrasonic signal can cover as many frequency ranges as possible, ensures propagation quality of the ultrasonic signal, improves accuracy of recognizing a non-touch gesture by the electronic device, and resolves a problem that a recognition effect of the non-touch gesture cannot be ensured when the microphone uses a low sampling rate.

For example, when the ultrasonic signal includes two types of signals, both the two types of signals are autocorrelated signals, frequency ranges of the two types of signals fall within the first range, the two types of signals are emitted in a time division manner, the frequency ranges of the two types of signals are the same, and frequency change rates of the two types of signals are opposite.

For ease of description, in this application, when the speaker emits two types of signals, the two types of signals are respectively referred to as a first emitted signal and a second emitted signal. Correspondingly, an ultrasonic signal reflected by the first emitted signal is referred to as a first reflected signal, and an ultrasonic signal reflected by the second emitted signal is referred to as a second reflected signal.

Figure 6A:
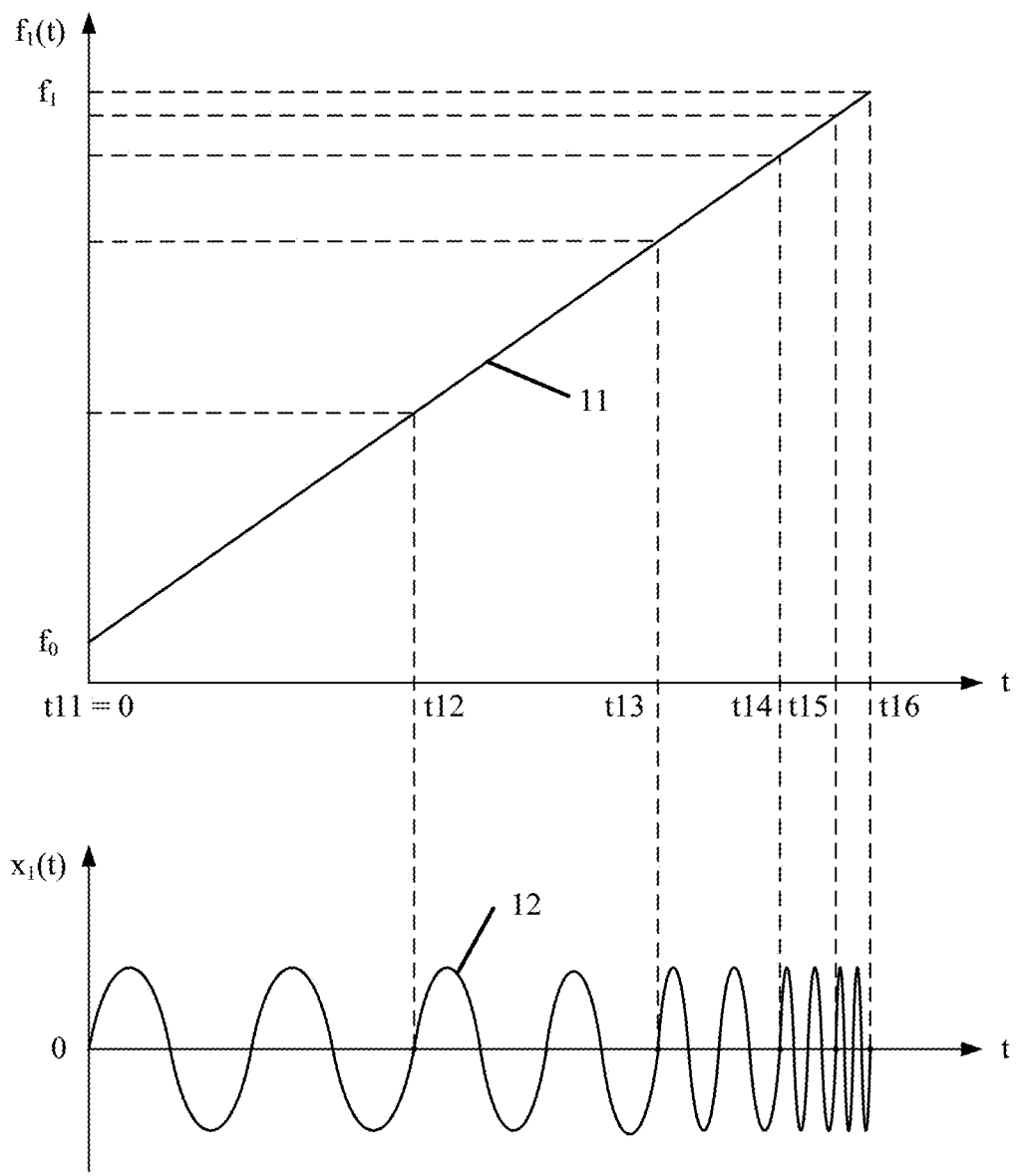
FIG. 6A is a schematic diagram of a waveform of a first emitted signal according to an embodiment of this application.
Figure 6B:
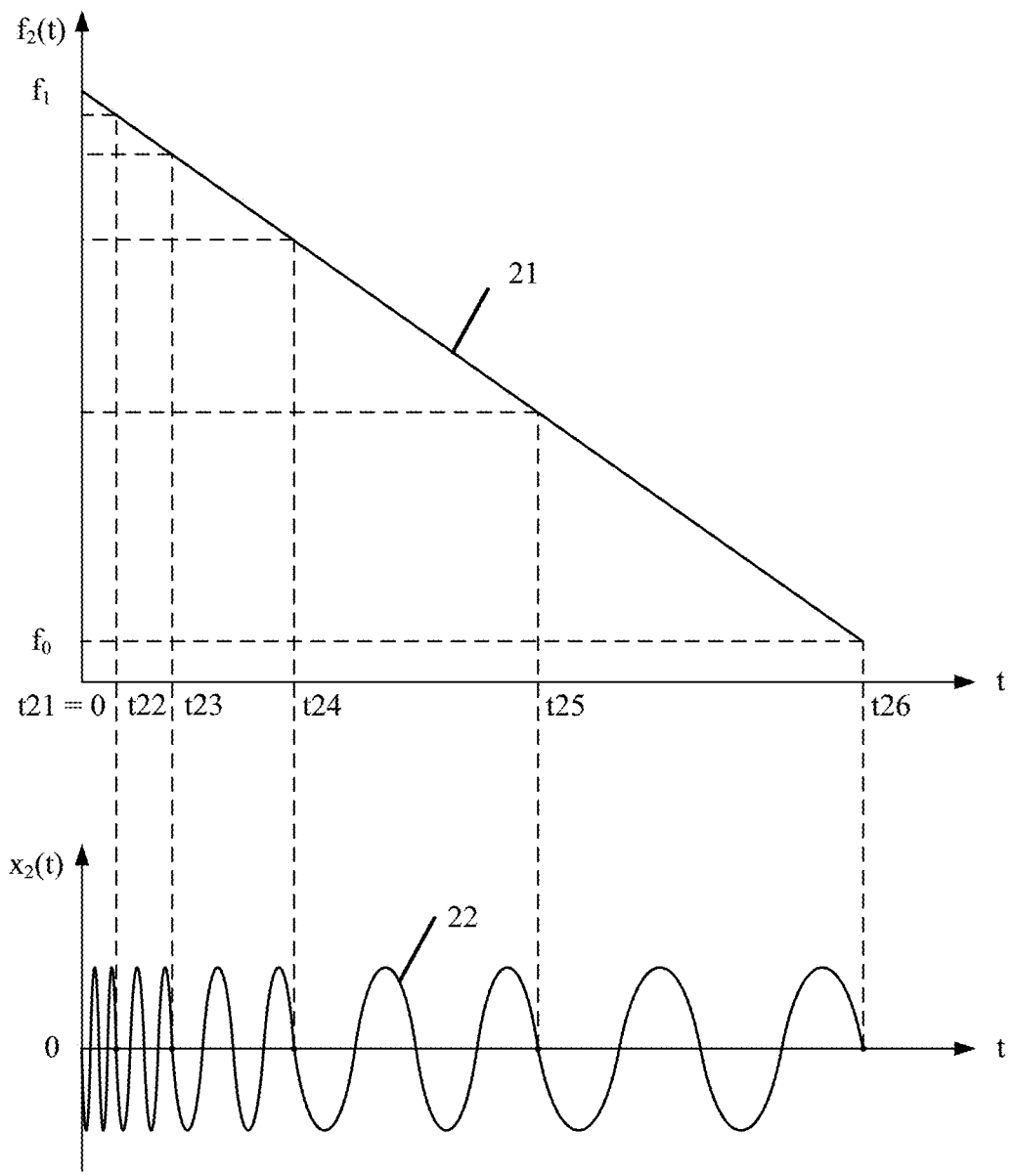
FIG. 6B is a schematic diagram of a waveform of a second emitted signal according to an embodiment of this application.

Based on the foregoing description, with reference to FIG. 6A and FIG. 6B, the following uses an example to describe the first emitted signal and the second emitted signal that are emitted by the electronic device through a speaker.

Refer to FIG. 6A and FIG. 6B. FIG. 6A is a schematic diagram of a waveform of a first emitted signal according to an embodiment of this application. FIG. 6B is a schematic diagram of a waveform of a second emitted signal according to an embodiment of this application.

When a frequency of an ultrasonic signal uses a linear frequency sweep mode of a chirp ultrasonic signal, as shown in FIG. 6A, a frequency $f_1(t)$ of a first emitted signal $x_1(t)$ corresponds to a curve 11 in FIG. 6A, and the first emitted signal $x_1(t)$ corresponds to a curve 12 in FIG. 6A. As shown in FIG. 6B, a frequency $f_2(t)$ of a second emitted signal $x_2(t)$ corresponds to a curve 21 in FIG. 6B, and the second emitted signal $x_2(t)$ corresponds to a curve 22 in FIG. 6B.

The first emitted signal or the second emitted signal $x_i(t)$ is a synchronized sweep sine signal (synchronized sweep sine signal). The first emitted signal or the second emitted signal $x_i(t)$ may be expressed as $x_i(t)=A_i \sin(\varphi(t))$. The frequency $f_1(t)$ of the first emitted signal $x_1(t)$ may be expressed as $f_1(t)=f_0+\beta t$, and the frequency $f_2(t)$ of the second emitted signal $x_2(t)$ may be expressed as $f_2(t)=f_1-\beta t$. The frequency $f_i(t)$ of the first emitted signal or the second emitted signal $x_i(t)$ is a function of time t, $f_i(t)$ varies with t, a value range of $f_i(t)$ is greater than or equal to $f_0$ and less than or equal to $f_1$, $f_0$ is greater than or equal to a minimum value of the first range, $f_1$ is less than or equal to a maximum value of the first range, and a value of i is 1 or 2.

It can be learned that the first emitted signal and the second emitted signal in FIG. 6A and FIG. 6B meet the foregoing condition:

A. A chirp signal is used, so that the first emitted signal and the second emitted signal $x_i(t)$ have good autocorrelation characteristics;

B. Because $f_0$ is greater than or equal to the minimum value of the first range and $f_1$ is less than or equal to the maximum value of the first range, the frequency $f_i(t)$ of the first emitted signal or the frequency of the second emitted signal falls within the first range; and C. A frequency range of the first emitted signal or a frequency range of the second emitted signal are the same (that is, both are greater than or equal to $f_0$ and less than or equal to $f_1$), and a frequency change rate of the first emitted signal or a frequency change rate of the second emitted signal are opposite (that is, the curve 11 gradually becomes larger, and the curve 21 gradually becomes smaller).

In addition, in FIG. 6A, the curve 21 shows a complete waveform of the first reflected signal. Correspondingly, minimum emission duration of the complete waveform of the first reflected signal is t16. In FIG. 6B, the curve 22 shows a complete waveform of the second reflected signal. Correspondingly, minimum emission duration of the complete waveform of the second reflected signal is t26.

It can be learned that the electronic device may be designed with at least one of the following conditions: each type of signal emitted by the speaker has a good autocorrelation characteristic, a frequency range of each type of signal falls within the first range, and two types of signals use a multi-channel manner, so that the electronic device can emit the ultrasonic signal to wide coverage through the speaker. A gesture recognition range of the electronic device is increased, and an effect of recognizing a non-touch gesture by the electronic device is further improved, so that the electronic device can accurately recognize the non-touch gesture. This helps accurately implement human-machine interaction of the non-touch gesture in a target application, and reduces costs of recognizing the non-touch gesture.

In addition, according to the electronic device, a frequency response of the ultrasonic signal may also be constrained. A minimum value of the frequency response of the ultrasonic signal is related to the gesture recognition range of the electronic device and sound source energy of the ultrasonic signal. A maximum value of the frequency response of the ultrasonic signal is also related to effect of sound pressure intensity of the ultrasonic signal on an organism (such as a bearer capacity of an eardrum).

In addition, according to the electronic device, emission duration of the ultrasonic signal and/or parameters such as a minimum propagation energy value and a maximum propagation energy value of the ultrasonic signal may be further designed based on the gesture recognition range of the electronic device.

2.2 Microphone

When the electronic device can collect a reflected signal through the microphone, the microphone needs to meet the following conditions.

A. A Minimum Value of a Frequency Response Falls within a Second Range.

A frequency response, namely, a frequency response (frequency response), is used to describe a capability of a microphone to respond to sound wave signals of different frequencies. The second range is related to the gesture recognition range of the electronic device.

The frequency range of the ultrasonic signal falls within the first range. Therefore, the microphone needs to respond to an ultrasonic signal at each frequency within the first range. Therefore, the minimum value of the frequency response of the microphone is set to fall within the second range, so that the microphone can receive the reflected signal within the first range within the gesture recognition range of the electronic device.

It should be noted that, generally, a frequency range of a reflected signal reflected when an ultrasonic signal encounters a non-touch gesture falls within the first range, and a frequency range of an ultrasonic signal reflected when an ultrasonic signal encounters an ambient environment of the electronic device does not fall within the first range, so that a frequency range of a reflected signal collected by the microphone is generally a full frequency band.

B. Sampling Rate

A size of a sampling rate of the microphone is not limited in this application. A commercially available microphone may be used in this application. Generally, a higher sampling rate of the microphone indicates better crystal oscillator performance, and a higher frequency indicates better effect of recognizing a non-touch gesture by the electronic device.

It can be learned that the electronic device may use a microphone that can collect a reflected signal, and the foregoing condition can improve performance of collecting the reflected signal by the microphone.

In conclusion, according to the electronic device, parameters of the speaker and the microphone are constrained, so that the speaker can emit ultrasonic signals as widely as possible, and the microphone can receive as many reflected signals as possible. This improves accuracy of recognizing a non-touch gesture by the electronic device, does not need to add an additional component or use an expensive component, and reduces costs of recognizing the non-touch gesture by the electronic device.

2. Software Design

In addition to the hardware design, the electronic device also proposes the software design for recognizing a non-touch gesture. In the software design, the electronic device can accurately estimate a gesture class of the non-touch gesture based on a feature change of a non-touch gesture indicated by a reflected signal reflected when an ultrasonic signal in a reflected signal encounters the non-touch gesture. Therefore, the electronic device can accurately recognize the non-touch gesture, and control a target application to respond to the non-touch gesture. This helps implement human-machine interaction of the non-touch gesture in the target application.

Figure 7:
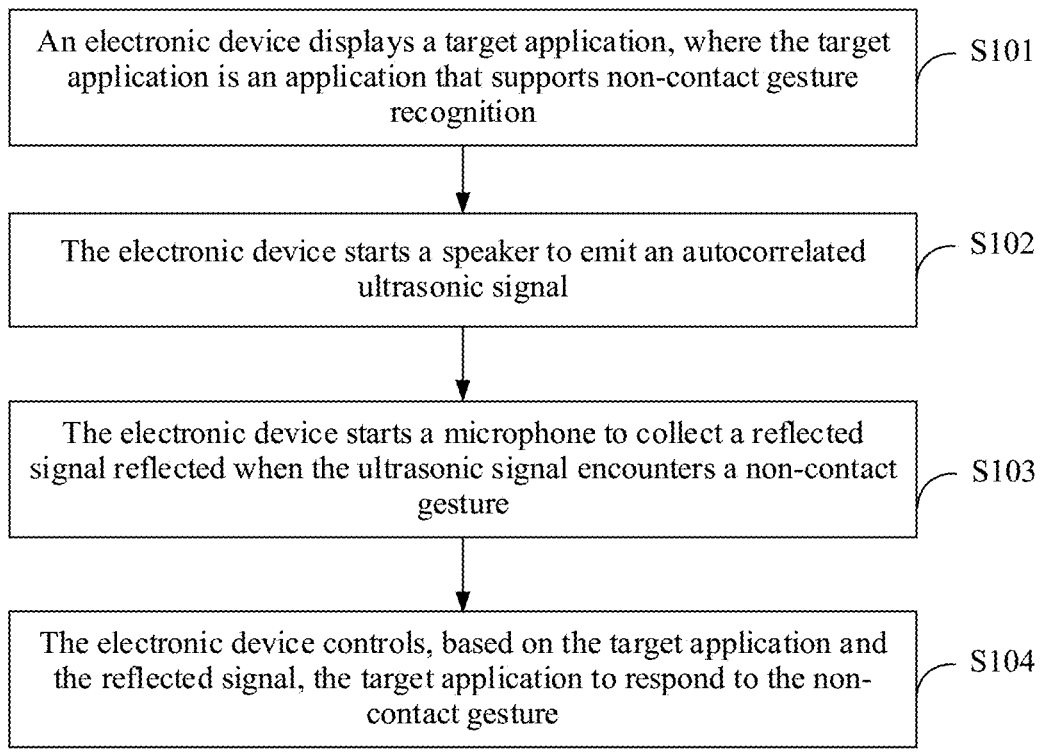
FIG. 7 is a schematic flowchart of a non-touch gesture control method according to an embodiment of this application.

Based on the foregoing description of the hardware design of the speaker and the microphone in the electronic device and with reference to FIG. 7, the following describes in detail the software design for the non-touch gesture control method implemented by the electronic device.

FIG. 7 is a schematic flowchart of the non-touch gesture control method according to an embodiment of this application. As shown in FIG. 7, the non-touch gesture control method in this application may include the following steps.

S101: An electronic device displays a target application, where the target application is an application that supports non-touch gesture recognition.

S102: The electronic device starts a speaker to emit an autocorrelated ultrasonic signal.

S103: The electronic device starts a microphone to collect a reflected signal reflected when the ultrasonic signal encounters a non-touch gesture.

S104: The electronic device controls, based on the target application and the reflected signal, the target application to respond to the non-touch gesture.

In conclusion, the electronic device can accurately implement human-machine interaction of the non-touch gesture in the target application by using the ultrasonic signal, hardware designs such as an existing speaker and a microphone in the electronic device, and software designs such as a gesture recognition algorithm. In this way, the electronic device can accurately control, in an environment with insufficient light or even a dark environment, the target application to respond to the non-touch gesture. This helps improve user experience in using the electronic device and the target application, does not need to add an additional component or use an expensive component in the electronic device, and reduces costs of controlling, by the electronic device, the target application to respond to the non-touch gesture.

The following describes in detail a specific implementation of each step in FIG. 7 with reference to the modules in FIG. 3A, FIG. 3B, and FIG. 4.

S101

In S101, the electronic device may display one or more user interfaces of the target application 28. In addition, in addition to the user interface of the target application 28, the electronic device may further display an icon of the target application 28, or the electronic device may further display a user interface of another application. This is not limited in this application.

It is considered that the electronic device may simultaneously display user interfaces of a plurality of applications (including the user interface of the target application 28), the electronic device may first identify the target application 28 through the application identification module 22, and then determine whether the target application 28 supports non-touch gesture recognition.

The application identification module 22 may identify, as the target application 28, an application that has been started in the electronic device and whose user interface is a focus window. The user interface mentioned above is a user interface of the target application 28 currently displayed in the electronic device. The application identification module 22 may identify the target application 28 in a plurality of manners.

In some embodiments, after an application is started, the electronic device may store an identifier of the application in a storage space of a software system, and the electronic device may simultaneously start a plurality of applications. In other words, identifiers corresponding to the plurality of applications may be stored in the storage space. Therefore, the application identification module 22 may obtain identifiers of all the applications from the storage space, to determine all applications that have been started.

Parameters such as a location and a size of the storage space are not limited in this application. The identifier of the application may be represented in a form, for example, an application name or an ID of the application.

The application identification module 22 may obtain, through an application programming interface (application programming interface, API) in the software system, an identifier of the application corresponding to the focus window in a manner such as invoking a function, to determine the target application 28.

Therefore, the application identification module 22 may determine whether an identifier of the target application 28 is stored in the storage space, to determine whether the target application 28 has been started. Therefore, when determining that the target application 28 has been started, the application identification module 22 may identify, as the target application 28, the application that has been started in the electronic device and whose focus window is the user interface.

In some other embodiments, the electronic device may simultaneously display the user interfaces of the plurality of applications (including the user interface of the target application 28), but a focus window of the electronic device is unique. Therefore, the scene recognition module 22 may obtain, in a manner such as a function, the user interface corresponding to the focus window.

Therefore, the application identification module 22 may search all applications that have been started for an application corresponding to the user interface corresponding to the focus window. Therefore, the application identification module 22 may identify, as the target application 28, the application that has been started in the electronic device and whose focus window is the user interface.

After identifying the target application 28, the application identification module 22 may determine, in a plurality of manners, whether the target application 28 supports non-touch gesture recognition. For specific implementations, refer to the descriptions in FIG. 3A, FIG. 3B, and FIG. 4. Details are not described herein again.

Therefore, after determining that the target application 28 supports non-touch gesture recognition, the application identification module 22 can start the speaker 23 to emit an ultrasonic signal, and start the microphone 24 to collect a reflected signal.

In addition, the electronic device may further send a trigger instruction to the application identification module 22 through the switch control module 21, so that the application identification module 22 performs S101 after receiving the trigger instruction. For a specific implementation, refer to the descriptions in FIG. 3A, FIG. 3B, and FIG. 4. Details are not described herein.

Therefore, the electronic device may be further designed in a manner of using whether the target application supports non-touch gesture recognition as a trigger condition for adaptively enabling or disabling the electronic device to implement the non-touch gesture control method, so that the electronic device can flexibly implement human-machine interaction of the non-touch gesture in the target application. This helps improve adaptability and flexibility of the electronic device, and further reduces overall power consumption of the electronic device.

In addition, after it is determined that the electronic device exits the target application or switches to a process that is in the target application and that does not support non-touch gesture recognition, the scene recognition module 22 may stop starting the speaker and the microphone, so that the target application does not continue to respond to the non-touch gesture. This is beneficial for the electronic device to adaptively implement human-machine interaction of the non-touch gesture, and further helps reduce overall power consumption of the electronic device.

In addition, when it is determined that the electronic device is not plugged in or remaining power of the electronic device is less than a second threshold, the scene recognition module 22 may stop starting the speaker and the microphone, and the switch control module 21 may switch a status of the first switch to not being in the first state, so that the electronic device disables a non-touch gesture recognition function of the electronic device. This fully considers availability of implementing human-machine interaction of the non-touch gesture by the electronic device, and further reduces overall power consumption of the electronic device. A specific value of the second threshold is not limited in this application.

In addition, after the electronic device and/or the target application does not support non-touch gesture recognition, the electronic device may display corresponding prompt information, to suggest that a user does not use a non-touch gesture to control the target application, or to use, in a plug-in manner, a non-touch gesture to control the target application. A specific implementation of the prompt information is not limited in this application.

It can be learned that the electronic device can adaptively enable or disable the non-touch gesture recognition function, to ensure adaptability and availability of implementing human-machine interaction of a non-touch gesture by the electronic device, and reduce overall power consumption of the electronic device.

S102

In S102, after the electronic device determines the target application, the electronic device may emit the autocorrelated ultrasonic signal through the speaker 23. For the autocorrelation mentioned above, refer to the foregoing description. Details are not described herein again. The ultrasonic signal may include one type of signal, or may include a plurality of types of signals. This is not limited in this application.

When the ultrasonic signal includes one type of signal, the one type of signal is an autocorrelated signal, and has a good autocorrelation characteristic, and a frequency range of the one type of signal falls within a first range. A manner in which the speaker 23 emits one type of signal is not limited in this application.

When there is one speaker 23, the speaker may continuously emit one type of signal, or may emit one type of signal at intervals. This is not limited in this application. When there are a plurality of speakers 23, the plurality of speakers may emit a plurality of types of signals in a time division manner, may emit a plurality of types of signals in a cross manner, or may simultaneously emit a plurality of types of signals. This is not limited in this application.

When the ultrasonic signal includes a plurality of types of signals, all the plurality of types of signals are autocorrelated signals, have good autocorrelation characteristics, and frequency ranges of all the plurality of types of signals fall within the first range. A manner in which the speaker 23 emits a plurality of types of signals is not limited in this application.

When there is one speaker 23, a plurality of sound channels of the speaker may respectively emit a plurality of types of signals. When there are a plurality of speakers 23, the plurality of speakers may respectively emit a plurality of types of signals. The speaker 23 may reflect a plurality of types of signals in a time division manner, a cross manner, a simultaneous manner, or the like. This is not limited in this application.

For example, the ultrasonic signal may include two types of signals. Both the two types of signals are autocorrelated signals, both the two types of signals have good autocorrelation characteristics, frequency ranges of both the two types of signals fall within the first range, and the two types of signals are emitted in a multi-channel manner.

When there is one speaker, the speaker may include two channels, and the two channels may emit two types of signals in a time division manner. In other words, one channel emits a first emitted signal, and the other channel emits a second emitted signal after emission of the first emitted signal ends.

When there are at least two speakers, for the two speakers that are symmetrically disposed, the two speakers may emit two types of signals in a time division manner. In other words, one speaker emits a first emitted signal, and the other speaker emits a second emitted signal after emission of the first emitted signal ends.

In addition, in addition to that the two types of signals are emitted in a time division manner, frequency ranges of the two types of signals may be the same, and frequency change rates of the two types of signals may be opposite.

In conclusion, the electronic device starts the speaker to emit the ultrasonic signal, so that coverage of emission of the ultrasonic signal is wider, and the electronic device can collect, through the microphone, a reflected signal reflected when the ultrasonic signal encounters the non-touch gesture.

S103

In S103, after the ultrasonic signal is emitted, the ultrasonic signal may encounter a non-touch gesture, or may encounter an ambient environment of the electronic device. Therefore, the reflected signal reflected when the ultrasonic signal encounters the non-touch gesture is inevitably mixed with an ultrasonic signal reflected when the ultrasonic signal encounters the ambient environment of the electronic device.

A frequency range of the reflected signal reflected when the ultrasonic signal encounters the non-touch gesture falls within the first range, and a frequency range of the ultrasonic signal reflected when the ultrasonic signal encounters the ambient environment of the electronic device does not fall within the first range.

In conclusion, the electronic device can collect, through the microphone, the reflected signal reflected after the ultrasonic signal encounters the non-touch gesture.

S104

In S104, after the microphone collects the reflected signal, the electronic device may control, based on the target application and the reflected signal through the feature extraction module 25, the model inference module 26, and the response recognition module 27, the target application 28 to respond to the non-touch gesture.

An implementation of the foregoing process is described in detail below with reference to FIG. 8.

Figure 8:
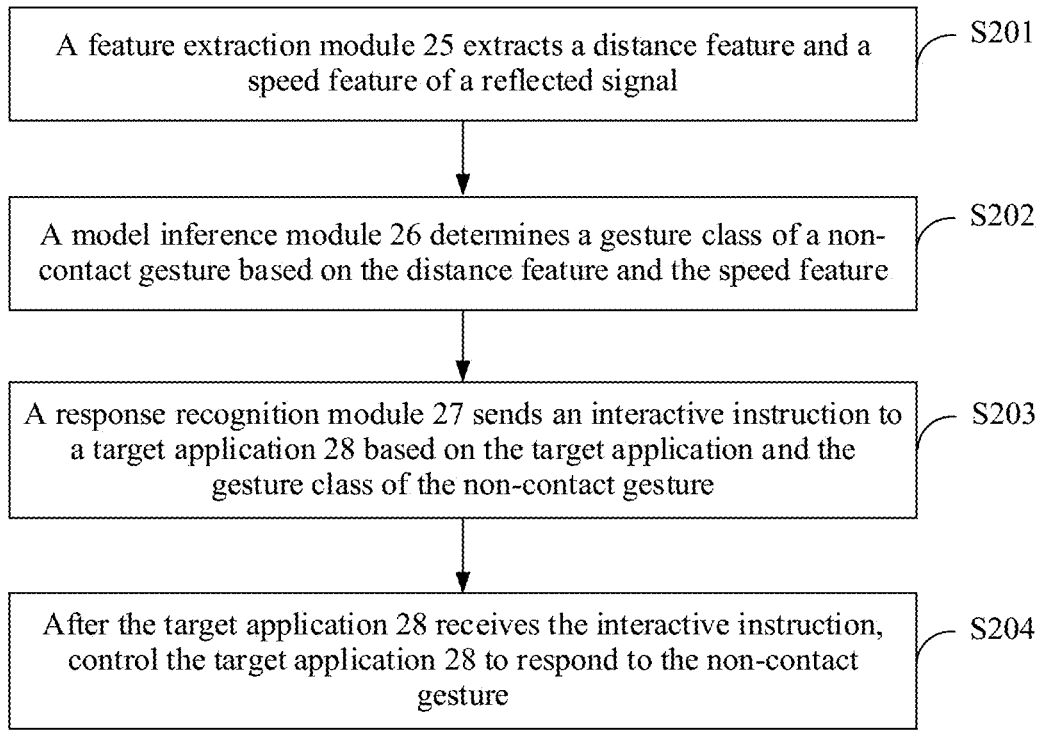
FIG. 8 is a schematic flowchart of a non-touch gesture control method according to an embodiment of this application.

FIG. 8 is a schematic flowchart of the non-touch gesture control method according to an embodiment of this application. As shown in FIG. 8, the non-touch gesture control method in this application may include the following steps.

S201: The feature extraction module 25 extracts a distance feature and a speed feature of a reflected signal.

S202: The model inference module 26 determines a gesture class of a non-touch gesture based on the distance feature and the speed feature.

S203: The response recognition module 27 sends an interactive instruction to the target application 28 based on the target application and the gesture class of the non-touch gesture.

S204: After the target application 28 receives the interactive instruction, control the target application 28 to respond to the non-touch gesture.

In conclusion, the electronic device can accurately identify the non-touch gesture, and implement human-machine interaction of the non-touch gesture in the target application, without considering constraints such as ambient light, component costs, and component materials, to improve user experience in using the electronic device and the target application, and reduce costs of recognizing the non-touch gesture by the electronic device.

S201

In S201, the feature extraction module 25 may represent a feature of the reflected signal by using a feature heat map. Therefore, the feature extraction module 25 may determine the gesture class of the non-touch gesture by using the feature heat map with reference to an arrangement location of the microphone 24.

The following describes in detail a specific implementation of a feature heat map with reference to FIG. 9A to FIG. 9C, FIG. 10A to FIG. 10D, and FIG. 11A to FIG. 11D.

For ease of description, in FIG. 9A to FIG. 9C, FIG. 10A to FIG. 10D, and FIG. 11A to FIG. 11D, an example in which an electronic device is a notebook computer, the electronic device includes four microphones (mic 1, mic 2, mic 3, and mic 4) that are evenly disposed at a distance, all the four microphones are disposed at a housing side a5 that is of the notebook computer, that surrounds a keyboard, and that faces a user side, and a speaker in the electronic device emits two types of signals is used for illustration.

In FIG. 9A to FIG. 9C, FIG. 10A to FIG. 10D, and FIG. 11A to FIG. 11D, a horizontal coordinate of the feature heat map uses a time dimension, and the horizontal coordinate represents a quantity of frames, and millisecond (ms) is used as a unit. Duration of one frame is greater than or equal to a sum of minimum emission duration of a complete waveform of the first emitted signal and minimum emission duration of a complete waveform of the second emitted signal.

The first reflected signal in FIG. 6A and the second reflected signal in FIG. 6B are used as an example, and the minimum emission duration of the complete waveform of the first reflected signal is t16 shown in FIG. 6A, and is about 10 ms. The emission duration of the complete waveform of the second reflected signal is t26 shown in FIG. 6B, and is about 10 ms. In this case, the duration of one frame is greater than or equal to t16+t26, and is about 20 ms (10 ms+10 ms).

For example, duration of an interval between the first reflected signal and the second reflected signal is equal to 0. After the speaker emits the first reflected signal, the speaker may directly emit the second reflected signal. In this case, the duration of one frame is greater than the sum of the minimum emission duration of the complete waveform of the first emitted signal and the minimum emission duration of the complete waveform of the second emitted signal.

For example, duration of an interval between the first reflected signal and the second reflected signal is greater than 0. After the speaker emits the first reflected signal, the speaker emits the second reflected signal after the duration of the interval expires. In this case, the duration of one frame is equal to a sum of the minimum emission duration of the complete waveform of the first emitted signal, the minimum emission duration of the complete waveform of the second emitted signal, and the duration of the interval.

In FIG. 9A to FIG. 9C, FIG. 10A to FIG. 10D, and FIG. 11A to FIG. 11D, a vertical coordinate of the feature heat map uses a feature dimension, and a number N on the vertical coordinate represents an $N^{th}$ channel impulse response (channel impulse response, CIR) feature that is a dimensionless quantity and may represent an actual distance between the microphone and a hand of the user. A smaller number on the vertical coordinate indicates a smaller actual distance.

The speaker needs to emit two types of emitted signals (namely, the first emitted signal and the second emitted signal). Therefore, the microphone may collect two types of reflected signals (namely, the first reflected signal and the second reflected signal). In this way, each microphone may include two channels, and each channel may collect one type of reflected signal, that is, one channel may collect the first reflected signal, and the other channel may collect the second reflected signal.

For four microphones, there are eight channels in total. Therefore, each channel is divided into 64 dimensions, that is, one channel in each microphone may reflect a change of the collected first reflected signal in 64 dimensions on the vertical coordinate, and another channel in each microphone may reflect a change of the collected second reflected signal in another 64 dimensions on the vertical coordinate. Based on the foregoing description, a total length of CIR features on the vertical coordinate is 512.

Numbers 1 to 64 and 65 to 128 on the vertical coordinate represent two channels of the mic 1, that is, one channel of the mic 1 collects the first reflected signal, and the other channel of the mic 1 collects the second reflected signal.

Numbers 129 to 192 and 193 to 256 on the vertical coordinate represent two channels of the mic 2, that is, one channel of the mic 2 collects the first reflected signal, and the other channel of the mic 2 collects the second reflected signal.

Numbers 257 to 320 and 321 to 384 on the vertical coordinate represent two channels of the mic 3, that is, one channel of the mic 3 collects the first reflected signal, and the other channel of the mic 3 collects the second reflected signal.

Numbers 385 to 448 and 449 to 512 on the vertical coordinate represent two channels of the mic 4, that is, one channel of the mic 4 collects the first reflected signal, and the other channel of the mic 4 collects the second reflected signal.

In FIG. 9A to FIG. 9C, FIG. 10A to FIG. 10D, and FIG. 11A to FIG. 11D, a coordinate point in the feature heat map uses a color dimension (for example, black, white, and gray), and the coordinate point represents a size of a CIR feature, and may indicate energy of a reflected signal. That a color of the coordinate point is white indicates stronger energy of the reflected signal and a closer actual distance between the microphone and the hand of the user. In addition, when the color of the coordinate point is black or the color of the coordinate point is gray, the hand of the user is in a static state or the actual distance between the microphone and the hand of the user is longer.

Figure 9A:
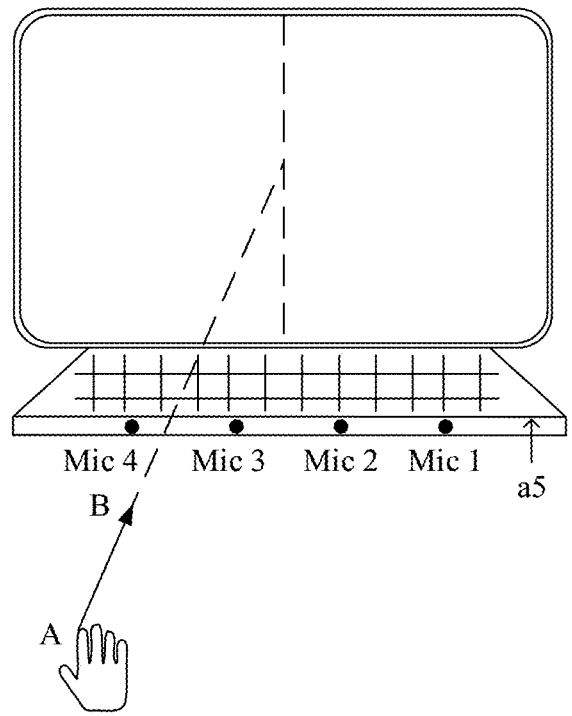
FIG. 9A is a schematic diagram of a scenario in which a non-touch gesture is that a hand of a user approaches an electronic device according to an embodiment of this application.
Figure 9B:
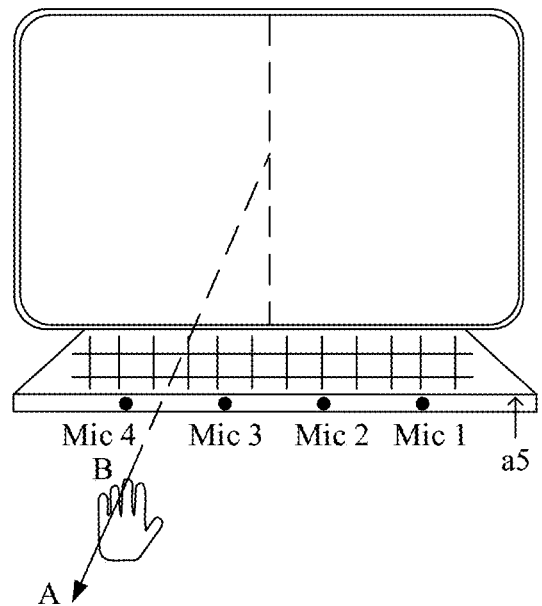
FIG. 9B is a schematic diagram of a scenario in which a non-touch gesture is that a hand of a user departs from an electronic device according to an embodiment of this application.
Figure 9C:
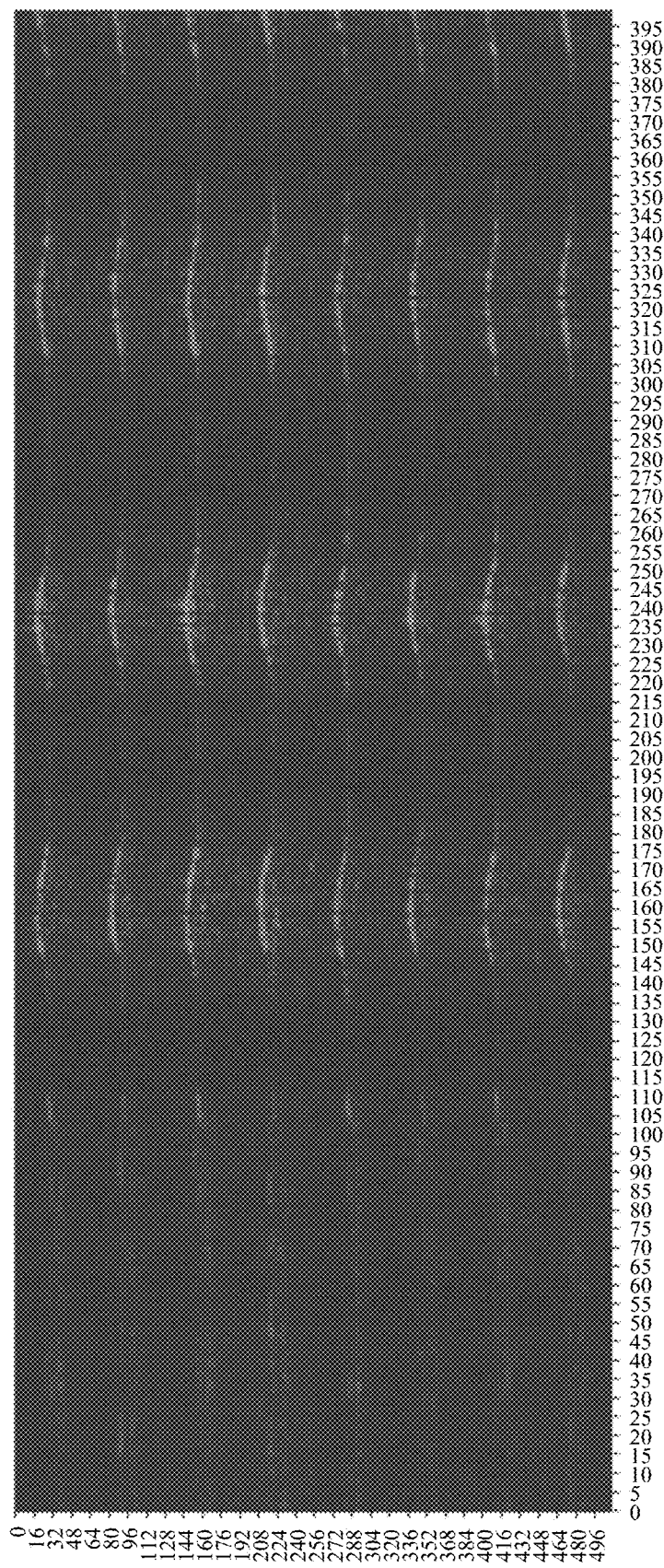
FIG. 9C is a schematic diagram of a feature heat map corresponding to a non-touch gesture that a hand of a user first approaches an electronic device and then departs from the electronic device according to an embodiment of this application.

Refer to FIG. 9A to FIG. 9C. FIG. 9A is a schematic diagram of a scenario in which a non-touch gesture is that a hand of a user approaches an electronic device according to an embodiment of this application. FIG. 9B is a schematic diagram of a scenario in which a non-touch gesture is that a hand of a user departs from an electronic device according to an embodiment of this application. FIG. 9C is a schematic diagram of a feature heat map corresponding to a non-touch gesture that a hand of a user first approaches an electronic device and then departs from the electronic device according to an embodiment of this application.

In FIG. 9A and FIG. 9B, a dashed line indicates that there is a distance between the hand of the user and the notebook computer, that is, the non-touch gesture is an air gesture. In FIG. 9A, the hand of the user gradually approaches the notebook computer along a direction of a ray AB, and the foregoing non-touch gesture is referred to as a push action. In FIG. 9B, the hand of the user gradually departs from the notebook computer along a direction of a ray BA, and the foregoing non-touch gesture is referred to as a pull action.

All the four microphones are disposed on one surface of the notebook computer. Therefore, in FIG. 9C, when the hand of the user approaches or departs from the electronic device, change trends of actual distances between the hand of the user and the four microphones are the same. To be specific, change trends of energy of reflected signals (the first reflected signal or the second reflected signal) respectively received by the four microphones are also the same.

The channel of the mic 1 corresponding to the numbers 1 to 64 on the vertical coordinate is used as an example. In FIG. 9C, as time goes by, between frames 135 to 158, colors of coordinate points become white, and numbers on the vertical coordinate become smaller. In other words, the hand of the user approaches the four microphones. Between frames 159 to 178, colors of coordinate points become black, and numbers on the vertical coordinate become larger. In other words, the hand of the user gradually departs from the four microphones.

Therefore, the electronic device may determine that the hand of the user first performs a push action, and then performs a pull action.

Figure 10A:
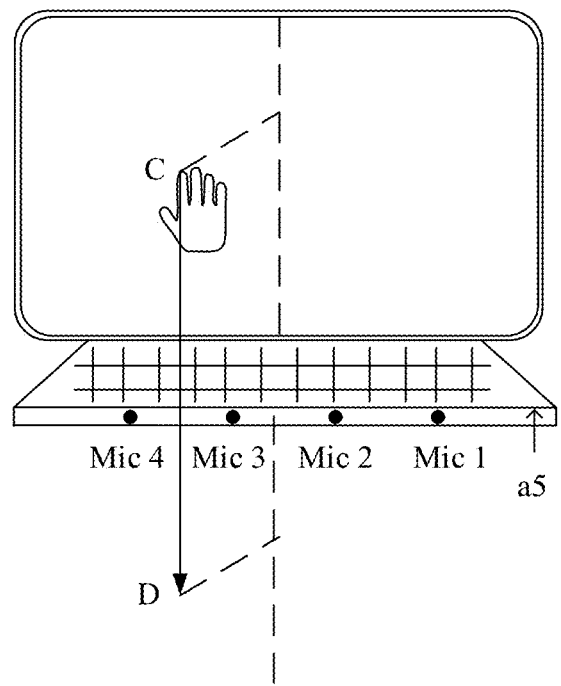
FIG. 10A is a schematic diagram of a scenario in which a non-touch gesture is that a hand of a user swings downward according to an embodiment of this application.
Figure 10B:
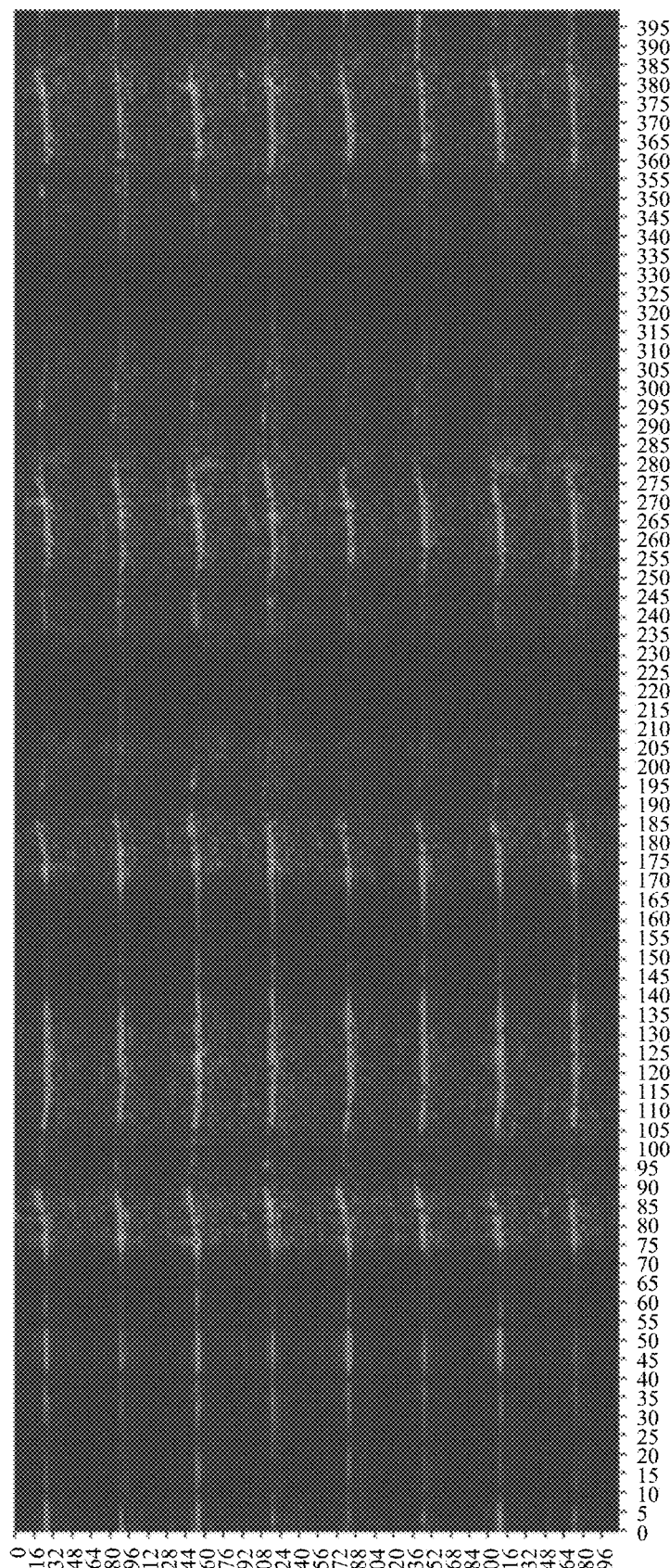
FIG. 10B is a feature heat map corresponding to a non-touch gesture that a hand of a user swings downward according to an embodiment of this application.
Figure 10C:
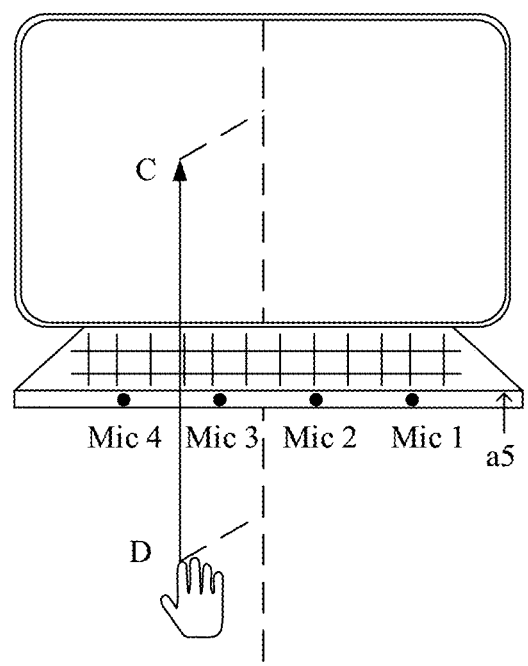
FIG. 10C is a schematic diagram of a scenario in which a non-touch gesture is that a hand of a user swings upward according to an embodiment of this application.
Figure 10D:
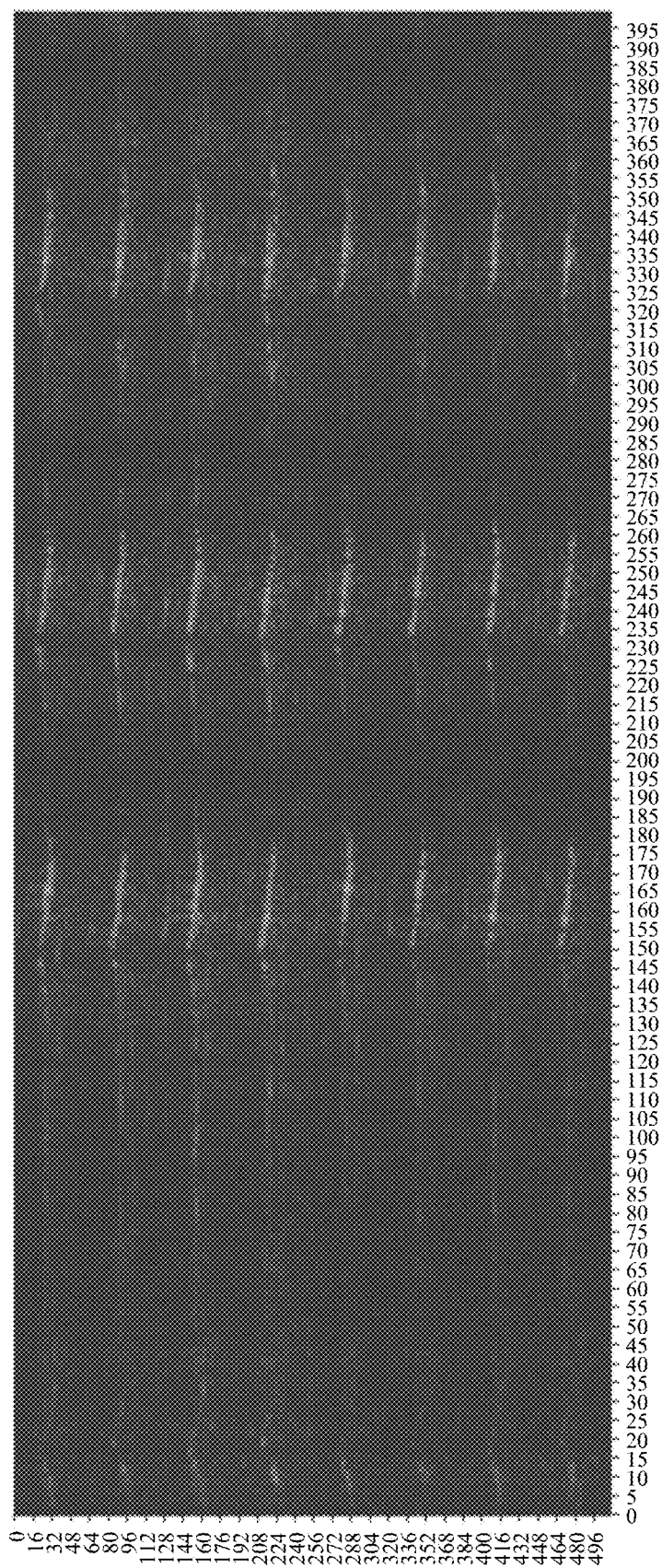
FIG. 10D is a feature heat map corresponding to a non-touch gesture that a hand of a user swings upward according to an embodiment of this application.

Refer to FIG. 10A to FIG. 10D. FIG. 10A is a schematic diagram of a scenario in which a non-touch gesture is that a hand of a user swings downward according to an embodiment of this application. FIG. 10B is a feature heat map corresponding to a non-touch gesture that a hand of a user swings downward according to an embodiment of this application. FIG. 10C is a schematic diagram of a scenario in which a non-touch gesture is that a hand of a user swings upward according to an embodiment of this application. FIG. 10D is a feature heat map corresponding to a non-touch gesture that a hand of a user swings upward according to an embodiment of this application.

In FIG. 10A and FIG. 10C, a dashed line indicates that there is a distance between the hand of the user and the notebook computer, that is, the non-touch gesture is an air gesture. In FIG. 10A, the hand of the user swings downward along a direction of a ray CD, and the foregoing non-touch gesture is referred to as a downward swing action. In FIG. 10C, the hand of the user swings upward along a direction of a ray DC, and the foregoing non-touch gesture is referred to as an upward swing action.

All the four microphones are disposed on one surface of the notebook computer. Therefore, in FIG. 10B, when the hand of the user swings downward or upward, change trends of actual distances between the hand of the user and the four microphones are the same. To be specific, change trends of energy of reflected signals (the first reflected signal or the second reflected signal) respectively received by the four microphones are also the same.

The channel of the mic 1 corresponding to the numbers 1 to 64 on the vertical coordinate is used as an example. In FIG. 10B, as time goes by, between frames 169 to 188, colors of coordinate points become white, and numbers on the vertical coordinate become smaller. In other words, the hand of the user approaches the four microphones. Between frames 189 to 250, colors of coordinate points become black. It indicates that the hand of the user departs from the four microphones.

Therefore, the electronic device may determine that the hand of the user performs the downward swing action.

The channel of the mic 1 corresponding to the numbers 1 to 64 on the vertical coordinate is used as an example. In FIG. 10D, as time goes by, between frames 151 to 178, colors of coordinate points change from white to gray, and numbers on the vertical coordinate become larger. In other words, the hand of the user departs from the four microphones. Between frames 179 to 233, colors of coordinate points become black, which may indicate that the hand of the user departs from the four microphones.

Therefore, the electronic device may determine that the hand of the user performs the upward swing action.

Figure 11A:
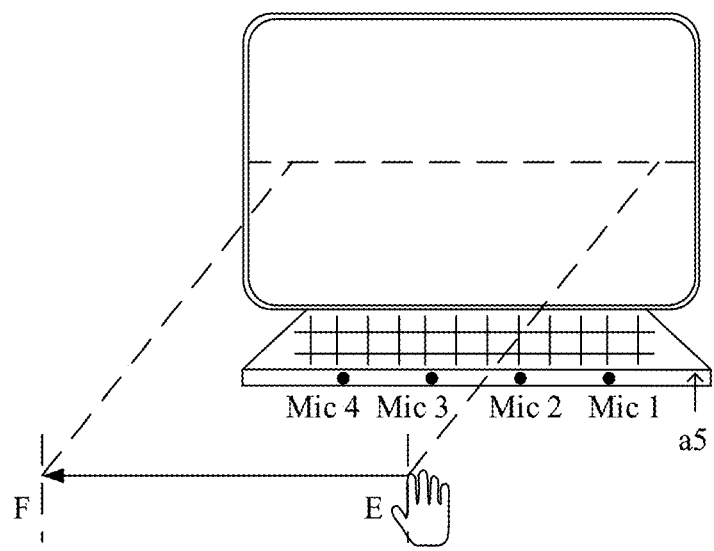
FIG. 11A is a schematic diagram of a scenario in which a non-touch gesture is that a hand of a user swings leftward according to an embodiment of this application.
Figure 11B:
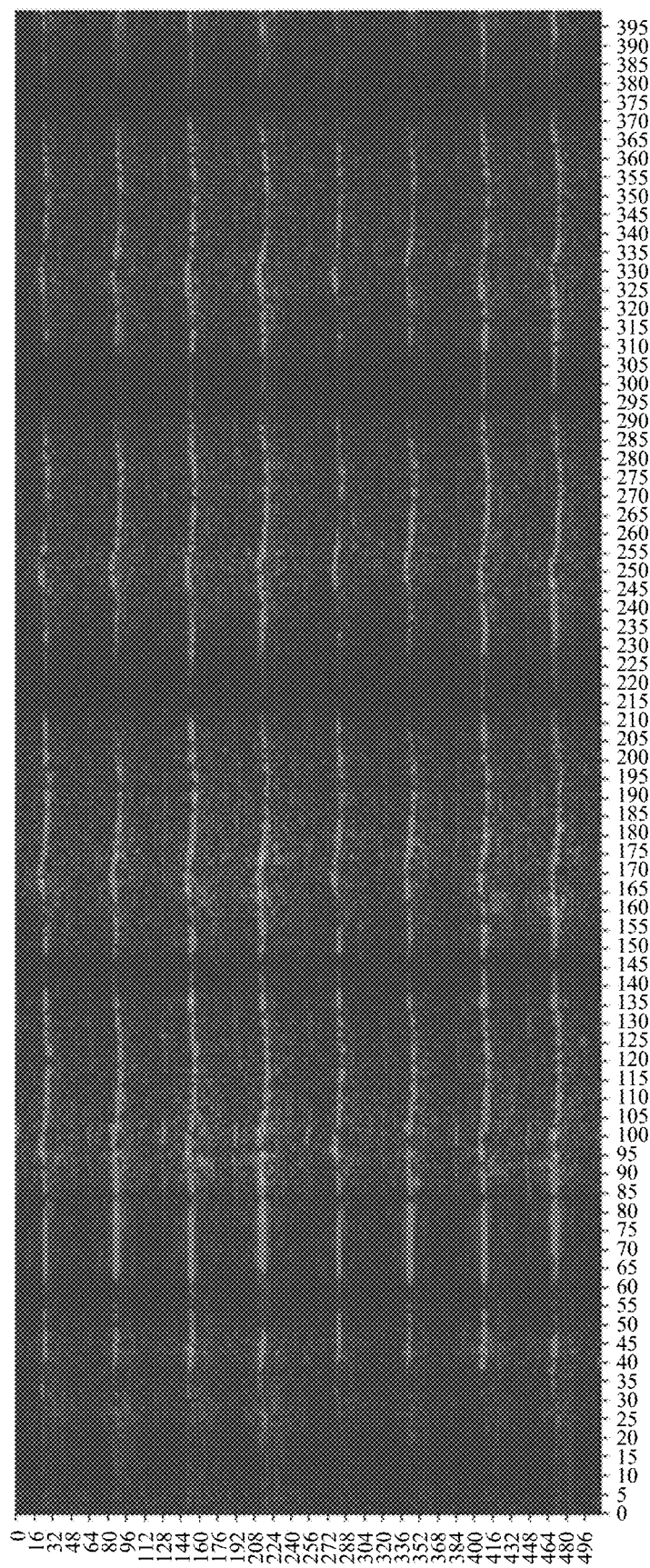
FIG. 11B is a feature heat map corresponding to a non-touch gesture that a hand of a user swings leftward according to an embodiment of this application.
Figure 11C:
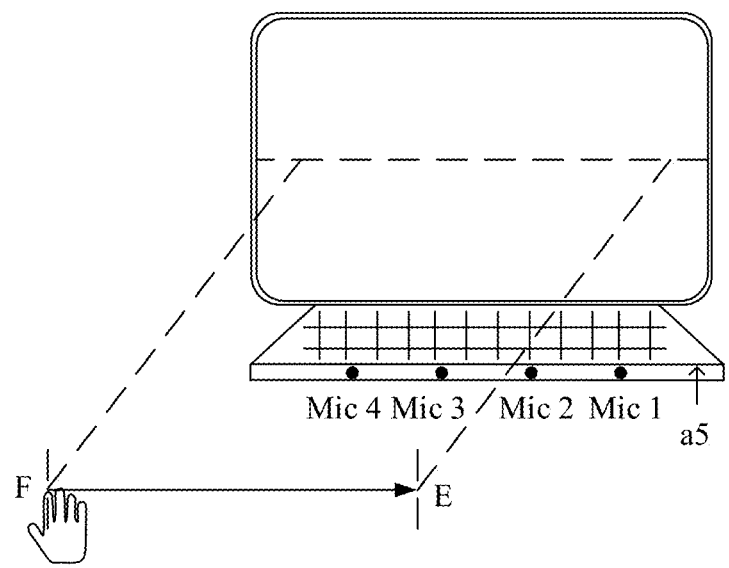
FIG. 11C is a schematic diagram of a scenario in which a non-touch gesture is that a hand of a user swings rightward according to an embodiment of this application.
Figure 11D:
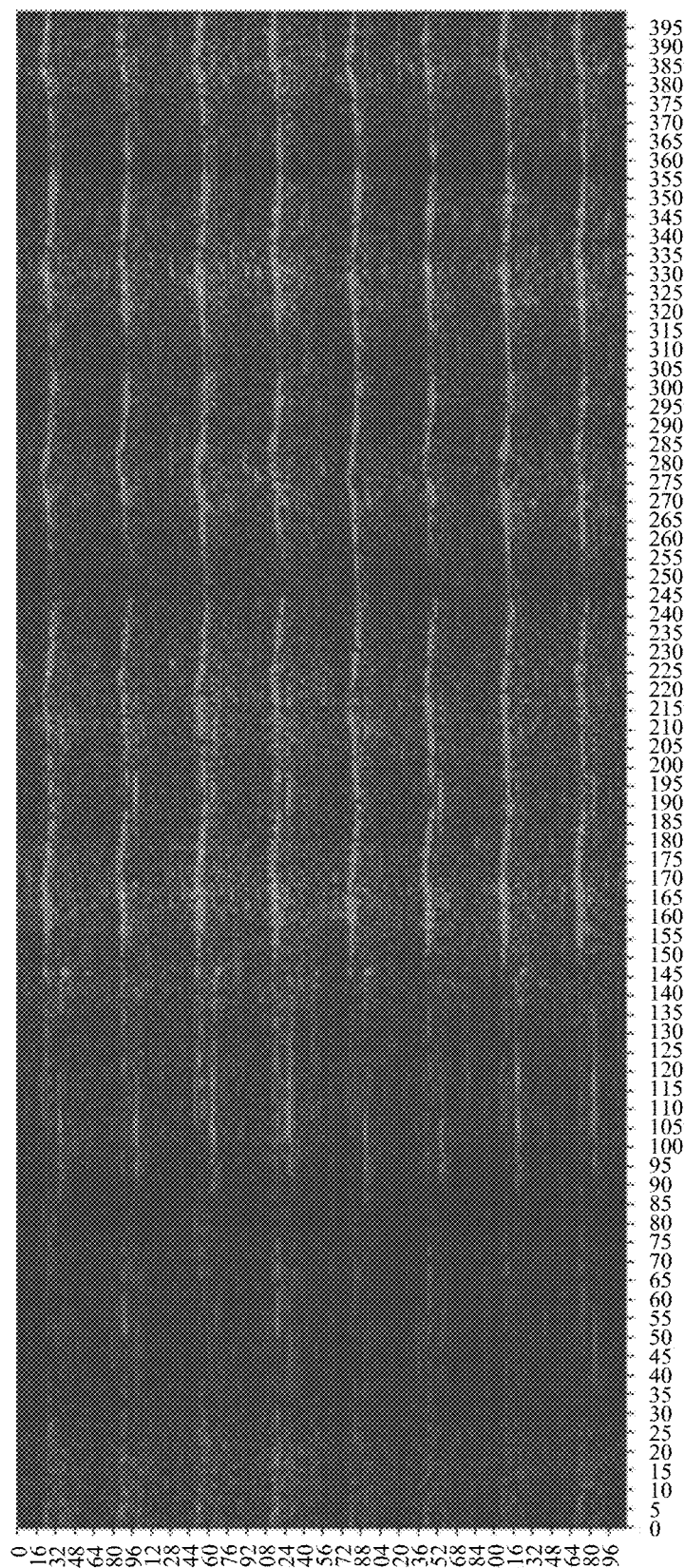
FIG. 11D is a feature heat map corresponding to a non-touch gesture that a hand of a user swings rightward according to an embodiment of this application.

Refer to FIG. 11A to FIG. 11D. FIG. 11A is a schematic diagram of a scenario in which a non-touch gesture is that a hand of a user swings leftward according to an embodiment of this application. FIG. 11B is a feature heat map corresponding to a non-touch gesture that a hand of a user swings leftward according to an embodiment of this application. FIG. 11C is a schematic diagram of a scenario in which a non-touch gesture is that a hand of a user swings rightward according to an embodiment of this application. FIG. 11D is a feature heat map corresponding to a non-touch gesture that a hand of a user swings rightward according to an embodiment of this application.

In FIG. 11A and FIG. 11C, a dashed line indicates that there is a distance between the hand of the user and the notebook computer, that is, the non-touch gesture is an air gesture. In FIG. 11A, the hand of the user swings leftward along a direction of a ray EF, and the foregoing non-touch gesture is referred to as a leftward swing action. In FIG. 11C, the hand of the user swings rightward along a direction of a ray FE, and the foregoing non-touch gesture is referred to as a rightward swing action.

All the four microphones are disposed on one surface of the notebook computer. Therefore, in FIG. 11B, when the hand of the user swings leftward or rightward, change trends of actual distances between the hand of the user and the four microphones are the same. To be specific, change trends of energy of reflected signals (the first reflected signal or the second reflected signal) respectively received by the four microphones are also the same.

The channel of the mic 1 corresponding to the numbers 1 to 64 on the vertical coordinate is used as an example. In FIG. 11B, as time goes by, between frames 149 to 212, colors of coordinate points become white, and numbers on the vertical coordinate first become smaller and then larger. In other words, the hand of the user first approaches and then departs from the four microphones.

In addition, at a same moment, for the channel of the mic 1 corresponding to the numbers 1 to 64 on the vertical coordinate, the channel of the mic 2 corresponding to the numbers 129 to 192 on the vertical coordinate, the channel of the mic 3 corresponding to the numbers 257 to 320 on the vertical coordinate, and the channel of the mic 4 corresponding to the numbers 385 to 448 on the vertical coordinate, colors of coordinate points become white, which may indicate that energy of the reflected signal increases in sequence.

Therefore, the electronic device may determine that the hand of the user performs the leftward swing action.

The channel of the mic 1 corresponding to the numbers 1 to 64 on the vertical coordinate is used as an example. In FIG. 11D, as time goes by, between frames 156 to 243, brightness of coordinate points becomes white, and numbers on the vertical coordinate first become smaller and then larger. In other words, the hand of the user first approaches and then departs from the four microphones.

In addition, at a same moment, for the channel of the mic 1 corresponding to the numbers 1 to 64 on the vertical coordinate, the channel of the mic 2 corresponding to the numbers 129 to 192 on the vertical coordinate, the channel of the mic 3 corresponding to the numbers 257 to 320 on the vertical coordinate, and the channel of the mic 4 corresponding to the numbers 385 to 448 on the vertical coordinate, colors of coordinate points become black, which may indicate that energy of the reflected signal decreases in sequence.

Therefore, the electronic device may determine that the hand of the user performs the rightward swing action.

In conclusion, the electronic device can determine the gesture class of the non-touch gesture with reference to arrangement locations of the microphones and the feature heat map. The arrangement locations of the microphones mentioned in this application may be understood as follows: When there is one microphone, the arrangement location of the microphone is a layout of the microphone in the electronic device. When there are at least two microphones, the arrangement locations of the microphones are layouts of the at least two microphones in the electronic device.

Therefore, the feature extraction module 25 may extract the distance feature and the speed feature of the reflected signal from the feature heat map.

Figure 12:
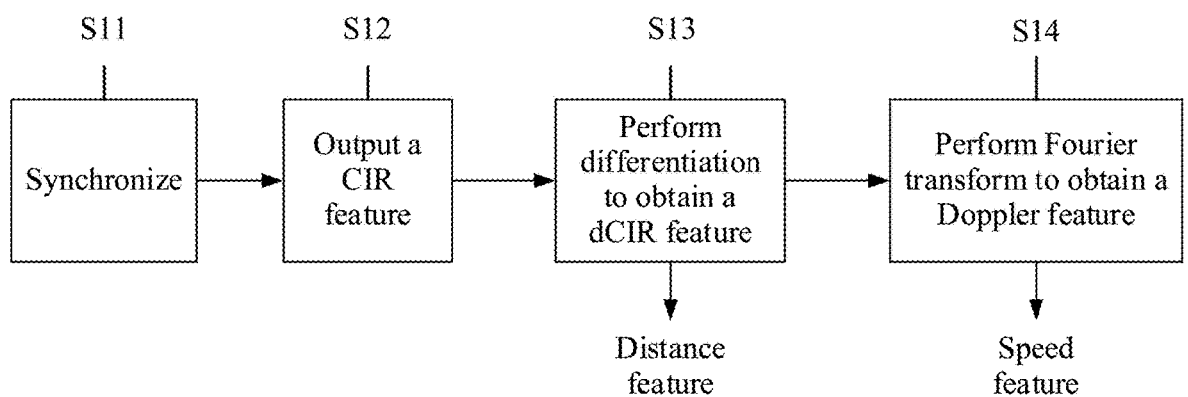
FIG. 12 is a flow block diagram of determining a distance feature and a speed feature by an electronic device according to an embodiment of this application.

FIG. 12 is a flow block diagram of determining a distance feature and a speed feature by an electronic device according to an embodiment of this application.

As shown in FIG. 12, a specific process of extracting the distance feature and the speed feature by the feature extraction module 25 may include the following steps.

S11: The feature extraction module 25 may synchronize the first emitted signal with the first reflected signal, so that the electronic device can obtain a start location of the first reflected signal, which facilitates subsequent impulse response estimation of a propagation channel.

Correspondingly, the feature extraction module 25 may synchronize the second emitted signal with the second reflected signal, so that the electronic device can obtain a start location of the second reflected signal, which facilitates subsequent impulse response estimation of the propagation channel.

S12: The feature extraction module 25 performs impulse response estimation of the propagation channel based on a good autocorrelation characteristic of the first reflected signal, performs matching filtering after processing by using a discrete Fourier transform (discrete Fourier transform, DFT) matrix, and performs inverse discrete Fourier transform (inverse discrete Fourier transform, IDFT) on an output signal spectrum of a matching filter.

Correspondingly, the feature extraction module 25 performs impulse response estimation of the propagation channel based on a good autocorrelation characteristic of the second reflected signal, performs matching filtering after processing by using a discrete Fourier transform (discrete Fourier transform, DFT) matrix, and performs inverse discrete Fourier transform (inverse discrete Fourier transform, IDFT) on an output signal spectrum of a matching filter.

In conclusion, the feature extraction module 25 can output a CIR feature, that is, the feature extraction module 25 can draw a feature heat map based on the first reflected signal and the second reflected signal, and the CIR feature is represented in the feature heat map. The CIR feature includes a CIR feature of a non-touch gesture and a CIR feature of an ambient environment of the electronic device.

S13: The feature extraction module 25 performs differentiation on the CIR feature in time dimension, to obtain a differential channel impulse response (diff channel impulse response, dCIR) feature of relative motion. The dCIR feature may indicate a distance change of a non-touch gesture. Thus, fixed influence of the ambient environment of the electronic device is removed. It can be learned that the dCIR feature is a distance feature.

S14: The feature extraction module 25 performs Fourier transform (for example, fast Fourier transform (fast Fourier transform, FFT)) in a long time period by using the dCIR feature in time dimension, to obtain a Doppler feature in the long time period. The Doppler feature may indicate a speed change of a non-touch gesture. It can be learned that the Doppler feature is a speed feature.

Therefore, the feature extraction module 25 may extract the distance feature and the speed feature of the reflected signal.

S202

In S202, the model inference module 26 may recognize the gesture class of the non-touch gesture based on the distance feature and the speed feature with reference to the arrangement location of the microphone.

In some embodiments, the model inference module 26 may receive the distance feature and the speed feature from the feature extraction module 25.

It should be noted that the non-touch gesture needs to take specific execution duration. Therefore, the feature extraction module 25 may send distance features and speed features of a fixed quantity of frames to the model inference module 26, so that the model inference module 26 can recognize a complete non-touch gesture.

The fixed quantity of frames is related to execution duration of a non-touch gesture. In addition, the fixed quantity of frames is also related to a response rate at which the electronic device recognizes a non-touch gesture. A specific value of the fixed quantity of frames is not limited in this application. For example, the fixed quantity of frames is 128.

After receiving the distance feature and the speed feature, the model inference module 26 may input the distance feature and the speed feature to a deep learning classification model corresponding to a gesture recognition algorithm for inference, to obtain the gesture class of the non-touch gesture.

The deep learning classification model corresponding to the gesture recognition algorithm may be a model, for example, a temporal convolutional neural network (temporal convolutional network, TCN).

The TCN is a variant of a convolutional neural network, and performs a sequence modeling task by combining a recurrent neural network (recurrent neural network, RNN) and a convolutional neural network (convolutional neural network, CNN) architecture. Compared with a long short-term memory (long short-term memory, LSTM) network, a convolutional architecture of the TCN has better performance on various tasks and data sets, and has longer effective memory.

A TCN model is based on a CNN model and has been improved as follows: 1. An applicable sequence model: causal convolution (causal convolution); and 2. Memory history: atrous convolution/dilated convolution (dilated convolution), and residual block (residual block). Moreover, compared with an RNN model, an architecture of the TCN model can take a sequence of arbitrary length and map the sequence to an output sequence of the same length. Thus, the TCN model has a very long effective history record, and the network has an enhancement of a residual layer and a combination of dilated convolutions.

Figure 13:
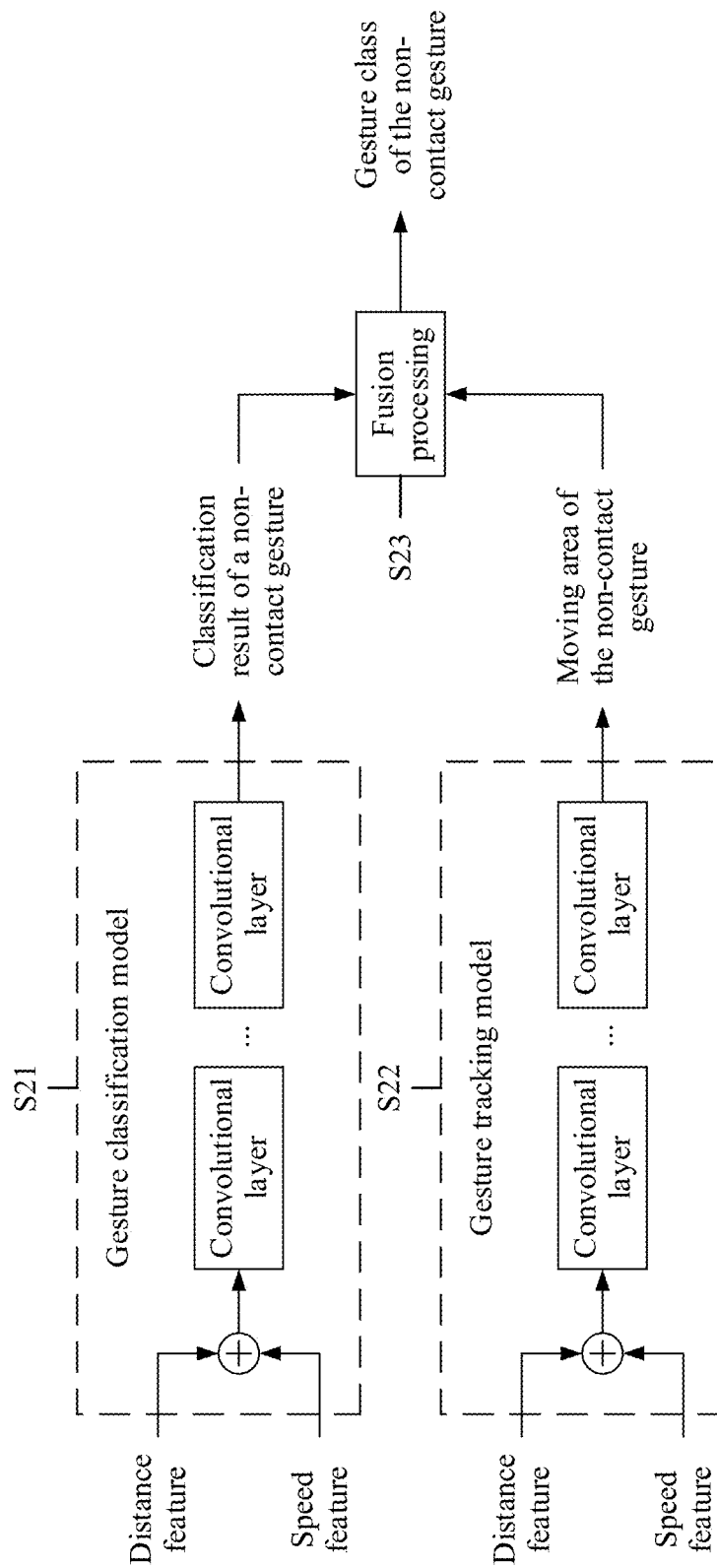
FIG. 13 is a flow block diagram of determining a gesture class of a non-touch gesture by an electronic device according to an embodiment of this application.

FIG. 13 is a flow block diagram of determining a gesture class of a non-touch gesture by an electronic device according to an embodiment of this application.

As shown in FIG. 13, a specific inference process of the TCN model may include the following steps.

S21: The model inference module 26 inputs a distance feature and a speed feature to a gesture classification model, and may output a classification result of a non-touch gesture.

The gesture classification model may be a multi-layer network model (shown as a multi-layer convolutional layer in FIG. 13). Specifically, a plurality of feature matrices are fused by using a CNN model, then multi-layer causal convolution is performed, all layers are connected based on residuals, and grid structure search and optimization are performed by using AutoML. Then, classification results of various non-touch gestures are obtained by training a plurality of training sets. The classification result may be represented as a gesture class of a coarse-grained non-touch gesture. For example, the classification results may be divided into a palm action, a finger action, and a hand action. For another example, the classification results may be divided into hovering, swinging, and change of a quantity of fingers.

S22: The model inference module 26 inputs the distance feature and the speed feature to a gesture tracking model, and may output a moving area (for example, 3D coordinates) of the non-touch gesture.

The gesture tracking model may be a multi-layer network model (shown as a multi-layer convolutional layer in FIG. 13). Specifically, a depth camera and all devices that can detect a hand location record coordinates for each gesture action, and a speed of the gesture may be calculated based on the coordinates. Based on labeling data (such as the gesture class, the coordinates, and the speed), a network model is redesigned, a classification function is implemented through network model training, and coordinates and a movement speed of the hand can be predicted.

In addition, the electronic device controls an action range of the gesture based on the coordinates of the hand. The electronic device implements rough gesture classification based on speed information of the gesture. In addition, unsuccessfully recognized gesture data does not enter the gesture classification model for secondary determining, and is directly output to another class. Secondary determining may be performed on successfully recognized gesture data again by the gesture classification model. In this way, the foregoing operations help reduce an accidental trigger of an interactive response, and improve classification precision of a non-touch gesture.

It should be noted that, in addition to the foregoing implementation, the gesture classification model and the gesture tracking model may further implement corresponding functions in other manners. In addition, the gesture classification model and the gesture tracking model may use a multi-layer network model with a same structure but different parameters.

S23: The model inference module 26 performs fusion inference based on the classification result of the non-touch gesture and the moving area of the non-touch gesture, to obtain a gesture class of a fine-grained non-touch gesture. In conclusion, the model inference module 26 can recognize the gesture class of the non-touch gesture based on the distance feature and the speed feature through the gesture classification model and the gesture tracking model with reference to the arrangement location of the microphone.

Therefore, the model inference module 26 can recognize, in a double check manner, whether a gesture is a non-touch gesture, and recognize a gesture class of the non-touch gesture.

S203

In S203, the response recognition module 27 may send an interactive instruction to the target application 28 based on the target application and the gesture class of the non-touch gesture.

In some embodiments, the response recognition module 27 may first determine, based on the target application and the gesture class of the non-touch gesture, an interactive response corresponding to the non-touch gesture, and then send the interactive instruction of the interactive response to the target application 28.

A specific implementation of the interactive response is not limited in this application. In some embodiments, the interactive response is a response corresponding to a non-touch gesture, for example, paging up or down, paging left or right, increasing volume, decreasing volume, switching a video, making a call, taking a screenshot, taking a long screenshot, recording a screen, switching an application, switching to a home screen, switching to a leftmost screen, or selecting a plurality of processes.

In addition, the interactive response may also be represented by using, for example, a keyboard control event, a mouse click event, or a touch event after tiling of samples of a screen, so that the target application 28 can execute, based on the foregoing event, the interactive response corresponding to the non-touch gesture.

Interactive responses represented by a same non-touch gesture in different types of applications may be the same or different. Therefore, the response recognition module 27 may determine, based on identifiers of applications, a correspondence between the gesture class of the non-touch gesture and the interactive response, and the target application and the gesture class of the non-touch gesture, the interactive response of the non-touch gesture to the target application 28.

A specific implementation of the correspondence is not limited in this application. In some embodiments, the correspondence may be stored in the electronic device in a representation manner such as a table, a matrix, an array, or a key-value (key-value). Therefore, the response recognition module 27 may determine the interactive instruction of the interactive response, and may send the interactive instruction of the interactive response to the target application 28. S204

In S204, after the target application 28 receives the interactive instruction, the target application 28 may be controlled to respond to the non-touch gesture, that is, the target application 28 may execute the interactive response corresponding to the non-touch gesture.

In conclusion, the electronic device can use the non-touch gesture to control, in a timely and accurate manner, the target application to execute the interactive response corresponding to the non-touch gesture, so that the electronic device can accurately and quickly implement human-machine interaction of the non-touch gesture in the target application.

For example, this application provides an electronic device, including a memory and a processor. The memory is configured to store program instructions. The processor is configured to invoke the program instructions in the memory, so that the electronic device performs the non-touch gesture control method in the foregoing embodiments.

For example, this application provides a chip system. The chip system is applied to an electronic device including a memory, a display, and a sensor. The chip system includes a processor. When the processor executes computer instructions stored in the memory, the electronic device performs the non-touch gesture control method in the foregoing embodiments.

For example, this application provides a computer-readable storage medium. The computer-readable storage medium stores a computer program. When the computer program is executed by a processor, an electronic device is enabled to implement the non-touch gesture control method in the foregoing embodiments.

For example, this application provides a computer program product, including execution instructions. The execution instructions are stored in a readable storage medium, and at least one processor of an electronic device may read the execution instructions from the readable storage medium. The at least one processor executes the execution instructions, so that the electronic device implements the non-touch gesture control method in the foregoing embodiments.

In the foregoing embodiments, all or some of the functions may be implemented by software, hardware, or a combination of software and hardware. When software is used to implement embodiments, all or some of embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the processes of the methods in embodiments may be implemented by a computer program instructing related hardware. The program may be stored in a computer-readable storage medium. When the program is executed, the processes of the methods in embodiments are performed. The foregoing storage medium includes any medium that can store program code, such as a ROM, a random access memory RAM, a magnetic disk, or an optical disc.

What is claimed is:

1. A method, applied to an electronic device comprising at least one speaker and at least one microphone, the method comprising:
    displaying a target application, wherein the target application comprises an application that supports non-touch gesture recognition;
    starting the at least one speaker to emit an autocorrelated ultrasonic signal;
    starting the at least one microphone to collect a reflected signal reflected after the ultrasonic signal encounters a non-touch gesture,
    wherein a minimum value of a frequency response of the microphone falls within a second range, and the second range ensures that the microphone is capable of receiving the reflected signal; and
    controlling, based on the target application and the reflected signal, the target application in response to the non-touch gesture.

2. The method according to claim 1, wherein:
    when the ultrasonic signal comprises one type of signal, the one type of signal comprises an autocorrelated signal, a frequency range of the one type of signal falls within a first range, and the first range is related to a sampling rate of the microphone and an ultrasonic frequency range.

3. The method according to claim 1, wherein:
    when the ultrasonic signal comprises two types of signals, both the two types of signals are autocorrelated signals, frequency ranges of the two types of signals fall within a first range, the two types of signals are emitted in a time division manner, the frequency ranges of the two types of signals are the same, frequency change rates of the two types of signals are opposite, and the first range is related to a sampling rate of the microphone and an ultrasonic frequency range.

4. The method according to claim 3, wherein the starting the at least one speaker to emit the ultrasonic signal comprises:
when the electronic device comprises one speaker, starting two channels of the speaker to emit the two types of signals in the time division manner; or
when the electronic device comprises two speakers, starting the two speakers to emit the two types of signals in the time division manner.

5. The method according to claim 1, wherein the ultrasonic signal comprises a chirp signal.

6. The method according to claim 1, wherein the controlling, based on the target application and the reflected signal, the target application in response to the non- touch gesture comprises:
extracting a distance feature and a speed feature of the reflected signal, wherein the distance feature indicates a change in a distance between a swing location of the non-touch gesture and the microphone, and the speed feature indicates a speed change of the non-touch gesture;
determining a gesture class of the non-touch gesture based on the distance feature and the speed feature; and
controlling, based on the target application and the gesture class of the non-touch gesture, the target application in response to the non-touch gesture.

7. The method according to claim 1, wherein:
when the electronic device comprises one microphone, the electronic device further comprises a shielding member of the microphone, the shielding member is configured to adjust a propagation direction or a propagation amount of the ultrasonic signal, and the electronic device is capable of distinguishing non-touch gestures in different directions; or
when the electronic device comprises at least two microphones, a maximum distance between the microphones is greater than a first threshold, and the first threshold is used to ensure that there is a location difference between the at least two microphones and a same speaker.

8. The method according to claim 1, wherein before the starting the at least one speaker to emit the autocorrelated ultrasonic signal, the method further comprises:
determining that a first switch of the electronic device is in a first state, wherein the first state of the first switch indicates that the electronic device enables a non-touch gesture recognition function.

9. The method according to claim 1, wherein the method further comprises, before the starting the at least one speaker to emit the autocorrelated ultrasonic signal:
determining that the target application supports the non-touch gesture recognition.

10. The method according to claim 9, wherein the determining that the target application supports the non-touch gesture recognition comprises:
when a storage module of the electronic device stores an identifier of the target application, determining that the target application supports the non-touch gesture recognition, wherein the storage module is configured to store identifiers of all applications that support the non-touch gesture recognition; or
when a second switch of the target application is in a second state, determining that the target application supports the non-touch gesture recognition, wherein a status of the second switch indicates whether the target application supports the non-touch gesture recognition.

11. The method according to claim 1, further comprising:
stopping the starting of the at least one speaker and the at least one microphone when the electronic device is not plugged in or remaining power of the electronic device is less than a second threshold.

12. A terminal device, comprising:
at least one processor; and
at least one memory, the at least one memory comprising instructions that when executed by the at least one processor, cause the terminal device to:
display a target application, wherein the target application comprises an application that supports non-touch gesture recognition;
start at least one speaker to emit an autocorrelated ultrasonic signal;
start at least one microphone to collect a reflected signal reflected after the ultrasonic signal encounters a non-touch gesture,
wherein a minimum value of a frequency response of the microphone falls within a second range, and the second range ensures that the microphone is capable of receiving the reflected signal; and
control, based on the target application and the reflected signal, the target application in response to the non-touch gesture.

13. The terminal device according to claim 12, wherein when the ultrasonic signal comprises one type of signal, the one type of signal comprises an autocorrelated signal, and a frequency range of the one type of signal falls within a first range, and
the first range is related to a sampling rate of the microphone and an ultrasonic frequency range.

14. The terminal device according to claim 12, wherein:
when the ultrasonic signal comprises two types of signals, both the two types of signals are autocorrelated signals, frequency ranges of the two types of signals fall within a first range, the two types of signals are emitted in a time division manner, the frequency ranges of the two types of signals are the same, frequency change rates of the two types of signals are opposite, and the first range is related to a sampling rate of the microphone and an ultrasonic frequency range.

15. The terminal device according to claim 12, wherein the instructions further cause the terminal device to:
when the terminal device comprises one speaker, start two channels of the speaker to emit the two types of signals in a time division manner; or
when the terminal device comprises two speakers, start the two speakers to emit the two types of signals in the time division manner.

16. The terminal device according to claim 12, wherein the ultrasonic signal comprises a chirp signal.

17. The terminal device according to claim 12, wherein the instructions further cause the terminal device to:
extract a distance feature and a speed feature of the reflected signal, wherein the distance feature indicates a change in a distance between a swing location of the non-touch gesture and the microphone, and the speed feature indicates a speed change of the non-touch gesture;
determine a gesture class of the non-touch gesture based on the distance feature and the speed feature; and
control, based on the target application and the gesture class of the non-touch gesture, the target application in response to the non-touch gesture.

18. At least one non-transitory computer-readable storage medium having instructions stored thereon that, in execution with at least one processor, is configured for:
- displaying a target application, wherein the target application comprises an application that supports non-touch gesture recognition;
- starting at least one speaker to emit an autocorrelated ultrasonic signal;
- starting at least one microphone to collect a reflected signal reflected after the ultrasonic signal encounters a non-touch gesture,
- wherein a minimum value of a frequency response of the microphone falls within a second range, and the second range ensures that the microphone is capable of receiving the reflected signal; and
- controlling, based on the target application and the reflected signal, the target application in response to the non-touch gesture.

\* \* \* \* \*